United States Patent
Cricrì et al.

(10) Patent No.: US 12,022,129 B2
(45) Date of Patent: Jun. 25, 2024

(54) HIGH LEVEL SYNTAX AND CARRIAGE FOR COMPRESSED REPRESENTATION OF NEURAL NETWORKS

(71) Applicant: Nokia Technologies Oy, Espoo (FI)

(72) Inventors: Francesco Cricrì, Tampere (FI); Miska Matias Hannuksela, Tampere (FI); Emre Baris Aksu, Tampere (FI); Hamed Rezazadegan Tavakoli, Espoo (FI)

(73) Assignee: Nokia Technologies Oy, Espoo (FI)

( * ) Notice: Subject to any disclaimer, the term of this patent is extended or adjusted under 35 U.S.C. 154(b) by 92 days.

(21) Appl. No.: 17/996,040

(22) PCT Filed: Apr. 13, 2021

(86) PCT No.: PCT/IB2021/053057
§ 371 (c)(1),
(2) Date: Oct. 12, 2022

(87) PCT Pub. No.: WO2021/209907
PCT Pub. Date: Oct. 21, 2021

(65) Prior Publication Data
US 2023/0209092 A1    Jun. 29, 2023

Related U.S. Application Data

(60) Provisional application No. 63/010,345, filed on Apr. 15, 2020.

(51) Int. Cl.
*H04N 19/70* (2014.01)
*H04N 19/124* (2014.01)
*H04N 19/42* (2014.01)

(52) U.S. Cl.
CPC .......... *H04N 19/70* (2014.11); *H04N 19/124* (2014.11); *H04N 19/42* (2014.11)

(58) Field of Classification Search
CPC ....... H04N 19/70; H04N 19/124; H04N 19/42
(Continued)

(56) References Cited

U.S. PATENT DOCUMENTS

2020/0034691 A1\*  1/2020  Mixter ...................... G06N 3/04
2022/0067527 A1\*  3/2022  Xu .......................... G06N 3/063

FOREIGN PATENT DOCUMENTS

WO     2021/140275 A1    7/2021

OTHER PUBLICATIONS

"Working Draft 3 of Compression of neural networks for multimedia content description and analysis", Video Subgroup, ISO/IEC JTC1/SC29/WG11/ N18992, Jan. 2020, 38 pages.

(Continued)

*Primary Examiner* — Allen C Wong
(74) *Attorney, Agent, or Firm* — Nokia Technologies Oy

(57) ABSTRACT

In example embodiments, an apparatus, a method, and a computer program product are provided. The apparatus includes at least one processor; and at least one non-transitory memory including computer program code; wherein the at least one memory and the computer program code are configured to, with the at least one processor, cause the apparatus at least to perform: encode or decode a high-level bitstream syntax for at least one neural network; wherein the high-level bitstream syntax comprises at least one information unit, wherein the at least one information unit comprises syntax definitions for the at least one neural network or a portion of the at least one neural network; and wherein a serialized bitstream comprises one or more of the at least one information units.

20 Claims, 8 Drawing Sheets

(58) Field of Classification Search
USPC .................................................. 375/240.26
See application file for complete search history.

(56) References Cited

OTHER PUBLICATIONS

"Information Technology—Coding Of Audio-Visual Objects—Part 12: ISO Base Media File Format", ISO/IEC 14496-12, Fifth edition, Dec. 15, 2015, 248 pages.

"Information Technology—Coding Of Audio-Visual Objects—Part 14: MP4 File Format", ISO/IEC 14496-14, First edition, Nov. 15, 2003, 18 pages.

"Information Technology—Coding Of Audio-Visual Objects—Part 15: Advanced Video Coding (AVC) File Format", ISO/IEC 14496-15, First edition, Apr. 15, 2004, 29 pages.

"3rd Generation Partnership Project; Technical Specification Group Services and System Aspects; Transparent end-to-end packet switched streaming service (PSS); 3GPP file format (3GP) (Release 15)", 3GPP TS 26.244, V15.0.0, Jun. 2018, pp. 1-67.

"Text of ISO/IEC DIS 15938-17 Compression of neural networks for multimedia content description and analysis (Edition 2)", ISO/IEC/JTC1/SC29/WG04, N0238, Aug. 22, 2022, 108 pages.

"Open Neural Network Exchange", ONNX, Retrieved on Nov. 10, 2022, Webpage available at : https://onnx.ai/.

"Neural Network Exchange Format (NNEF)", Khronos Group, Retrieved on Nov. 10, 2022, Webpage available at : https://www.khronos.org/nnef.

"Video Coding For Low Bit Rate Communication", Series H: Audiovisual And Multimedia Systems, Infrastructure of audiovisual services—Coding of moving Video, ITU-T Recommendation H.263, Jan. 2005, 226 pages.

"Advanced Video Coding For Generic Audiovisual services", Series H: Audiovisual And Multimedia Systems, Infrastructure of audio-visual services—Coding of moving Video, Recommendation ITU-T H.264, Apr. 2017, 812 pages.

"Information Technology—Generic Coding of Moving Pictures and Associated Audio Information: Systems", Series H: Audiovisual and Multimedia Systems, Infrastructure of Audiovisual Services—Transmission Multiplexing and Synchronization, Recommendation ITU-T H.222.0, Mar. 2017, 291 pages.

"Information technology—Generic coding of moving pictures and associated audio information: Video", Series H: Audiovisual and Multimedia Systems Infrastructure of audiovisual services—Coding of moving video, ITU-T Recommendation H.262, Feb. 2000, 220 pages.

"Information technology—Universal coded character set (UCS)", ISO/IEC 10646, Sixth edition, Dec. 2020, 9 pages.

"IEEE 802.11", Wikipedia, Retrieved on Nov. 10, 2022, Webpage available at : https://en.wikipedia.org/wiki/IEEE_802.11.

International Search Report and Written Opinion received for corresponding Patent Cooperation Treaty Application No. PCT/IB2021/053057, dated Jun. 22, 2021, 17 pages.

Aksu et al., "[NNR] On high-level bitstream syntax for compressed neural network representations", Nokia, ISO/IEC JTC1/SC29/WG11 MPEG2019/m51611, Jan. 2020, 6 pages.

Aksu et al., "[NNR] Extensions to the high-level bitstream syntax for compressed neural network representations", ISO/IEC JTC1/SC29/WG11/m53719, Apr. 15, 2020, 6 pages.

\* cited by examiner

HIGH LEVEL SYNTAX AND CARRIAGE FOR COMPRESSED REPRESENTATION OF NEURAL NETWORKS

RELATED APPLICATION

This application claims priority to PCT Application No. PCT/IB2021/053057, filed on Apr. 13, 2021, which claims priority to U.S. Provisional Application No. 63/010,345, filed on Apr. 15, 2020, each of which is incorporated herein by reference in its entirety.

TECHNICAL FIELD

The examples and non-limiting embodiments relate generally to multimedia transport and neural networks and, more particularly, to a high level syntax and carriage of a compressed representation of neural networks.

BACKGROUND

It is known to provide standardized formats for exchange of neural networks.

SUMMARY

An example apparatus includes at least one processor; and at least one non-transitory memory including computer program code; wherein the at least one memory and the computer program code are configured to, with the at least one processor, cause the apparatus at least to perform: encode or decode a high-level bitstream syntax for at least one neural network; wherein the high-level bitstream syntax comprises at least one information unit, wherein the at least one information unit comprises syntax definitions for the at least one neural network or a portion of the at least one neural network; and wherein a serialized bitstream comprises one or more of the at least one information units.

An example method includes encoding or decoding a high-level bitstream syntax for at least one neural network; wherein the high-level bitstream syntax comprises at least one information unit, wherein the at least one information unit comprises syntax definitions for the at least one neural network or a portion of the at least one neural network; and wherein a serialized bitstream comprises one or more of the at least one information units.

An example computer readable medium comprising program instructions for causing an apparatus to perform at least the following: encoding or decoding a high-level bitstream syntax for at least one neural network; wherein the high-level bitstream syntax comprises at least one information unit, wherein the at least one information unit comprises syntax definitions for the at least one neural network or a portion of the at least one neural network; and wherein a serialized bitstream comprises one or more of the at least one information units.

Another example apparatus includes at least one processor; and at least one non-transitory memory including computer program code; wherein the at least one memory and the computer program code are configured to, with the at least one processor, cause the apparatus at least to perform: encode or decode a high-level bitstream syntax for at least one neural network; wherein the high-level bitstream syntax comprises at least one information unit, wherein the at least one information unit comprises syntax definitions for extensions to the high-level bitstream syntax for the at least one neural network or a portion of the at least one neural network; and wherein a serialized bitstream comprises one or more of the at least one information units.

Yet another example apparatus includes at least one processor; and at least one non-transitory memory including computer program code; wherein the at least one memory and the computer program code are configured to, with the at least one processor, cause the apparatus at least to perform: encode or decode a high-level bitstream syntax for at least one neural network; wherein the high-level bitstream syntax comprises at least one information unit, wherein the at least one information unit comprises syntax definitions for the at least one neural network or a portion of the at least one neural network, and wherein the syntax definitions for one or more information units of the at least one information unit comprise information for enabling interoperability between a sender and a receiver of the one or more information units; and wherein a serialized bitstream comprises one or more of the at least one information unit.

A still another example apparatus includes at least one processor; and at least one non-transitory memory including computer program code; wherein the at least one memory and the computer program code are configured to, with the at least one processor, cause the apparatus at least to perform: define a data structure comprising: a count threshold field or object to specify a number of sparsification thresholds; a sparsification threshold field or object to specify a threshold which is applied to weights of a decoded least one neural network or a portion of the at least one neural network in order to set the weights to zero; a non-zero ratio field or object to specify a non-zero ratio that is achieved by applying the sparsification threshold to sparsify the weights of the decoded at least one neural network or the portion of the at least one neural network; a neural network accuracy field or object to specify an overall accuracy of the at least one neural network or the portion of the at least one neural network; a count classes field or object to specify a number of classes for which separate accuracies are provided for each sparsification threshold; and a neural network class accuracy field or object to specify accuracy for a certain class, when a certain sparsification threshold is applied.

Another example method includes encoding or decoding a high-level bitstream syntax for at least one neural network; wherein the high-level bitstream syntax comprises at least one information unit, and wherein the at least one information unit comprises syntax definitions for the at least one neural network or a portion of the at least one neural network, and wherein the syntax definitions comprise a performance mapping information, wherein the performance mapping information specifies a mapping between different sparsification thresholds and resulting neural network inference accuracies; and wherein a serialized bitstream comprises one or more of the at least one information units.

A still another example apparatus includes at least one processor; and at least one non-transitory memory including computer program code; wherein the at least one memory and the computer program code are configured to, with the at least one processor, cause the apparatus at least to perform: encode or decode a high-level bitstream syntax for at least one neural network; wherein the high-level bitstream syntax comprises at least one information unit, and wherein the at least one information unit comprises syntax definitions for the at least one neural network or a portion of the at least one neural network, and wherein the syntax definitions comprise a performance mapping information, wherein the performance mapping information specifies a mapping between different sparsification thresholds and resulting neural network inference accuracies; and wherein a serialized bitstream comprises one or more of the at least one information units.

Another example computer readable medium comprising program instructions for causing an apparatus to perform at least the following: encoding or decoding a high-level bitstream syntax for at least one neural network; wherein the high-level bitstream syntax comprises at least one information unit, and wherein the at least one information unit comprises syntax definitions for the at least one neural network or a portion of the at least one neural network, and wherein the syntax definitions comprise a performance mapping information, wherein the performance mapping information specifies a mapping between different sparsification thresholds and resulting neural network inference accuracies; and wherein a serialized bitstream comprises one or more of the at least one information units.

Yet another example method includes defining a data structure including: a count threshold field or object for specifying a number of sparsification thresholds; a sparsification threshold field or object for specifying a threshold which is applied to weights of a decoded the least one neural network or the portion of the at least one neural network in order to set the weights to zero; a non-zero ratio field or object for specifying a non-zero ratio that is achieved by applying the sparsification threshold to sparsify the weights of the decoded the at least one neural network or the portion of the at least one neural network; a neural network accuracy field or object for specifying an overall accuracy of the at least one neural network or the portion of the at least one neural network; a count classes field or object for specifying a number of classes for which separate accuracies are provided for each sparsification threshold; and a neural network class accuracy field or object for specifying accuracy for a certain class, when a certain sparsification threshold is applied.

A yet another example computer readable medium includes program instructions for causing an apparatus to perform at least the includes define a data structure includes: a count threshold field or object to specify a number of sparsification thresholds; a sparsification threshold field or object to specify a threshold which is applied to weights of a decoded the least one neural network or the portion of the at least one neural network in order to set the weights to zero; a non-zero ratio field or object to specify a non-zero ratio that is achieved by applying the sparsification threshold to sparsify the weights of the decoded the at least one neural network or the portion of the at least one neural network; a neural network accuracy field or object to specify an overall accuracy of the at least one neural network or the portion of the at least one neural network; a count classes field or object to specify a number of classes for which separate accuracies are provided for each sparsification threshold; and a neural network class accuracy field or object to specify accuracy for a certain class, when a certain sparsification threshold is applied.

A still another example apparatus includes means for encoding or decoding a high-level bitstream syntax for at least one neural network; and wherein the high-level bitstream syntax comprises at least one information unit, wherein the at least one information unit comprises syntax definitions for the at least one neural network or a portion of the at least one neural network; and wherein a serialized bitstream comprises one or more of the at least one information units.

BRIEF DESCRIPTION OF THE DRAWINGS

The foregoing embodiments and other features are explained in the following description, taken in connection with the accompanying drawings, wherein.

DETAILED DESCRIPTION OF EXAMPLE EMBODIMENTS

Figure 1:
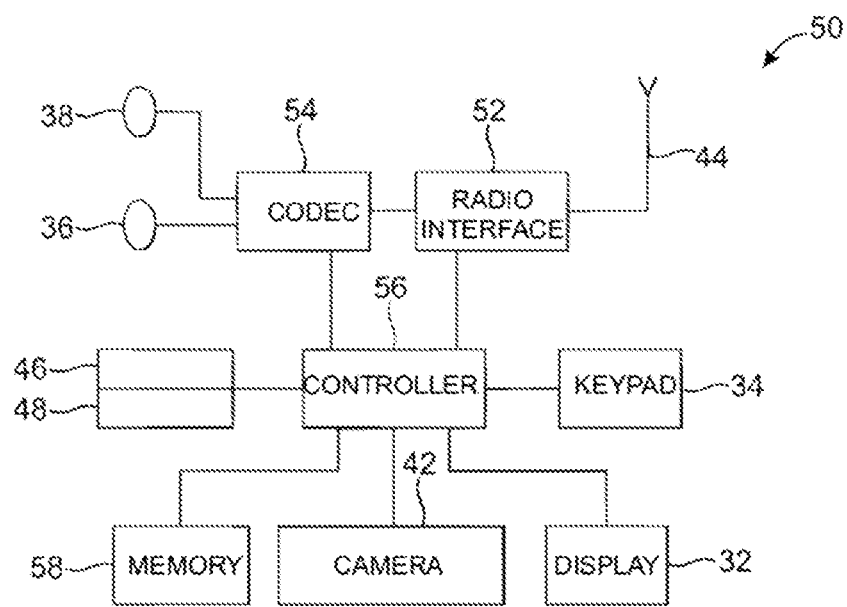
FIG. 1 shows schematically an electronic device employing embodiments of the examples described herein.

The following acronyms and abbreviations that may be found in the specification and/or the drawing figures are defined as follows:

| | |
|---|---|
| 3GP | 3GPP file format |
| 3GPP | 3rd Generation Partnership Project |
| 3GPP TS | 3GPP technical specification |
| 4CC | four character code |
| 4G | fourth generation of broadband cellular network technology |
| 5G | fifth generation cellular network technology |
| 5GC | 5G core network |
| ACC | accuracy |
| AI | artificial intelligence |
| AIOT | AI-enabled IoT |
| a.k.a. | also known as |
| AMF | access and mobility management function |
| AVC | advanced video coding |
| CABAC | context-adaptive binary arithmetic coding |
| CDMA | code-division multiple access |
| CE | core experiment |
| CU | central unit |
| DASH | dynamic adaptive streaming over HTTP |
| DCT | discrete cosine transform |
| DSP | digital signal processor |
| DU | distributed unit |
| eNB (or eNodeB) | evolved Node B (for example, an LTE base station) |
| EN-DC | E-UTRA-NR dual connectivity |
| en-gNB or | node providing NR user plane and control plane protocol terminations |
| En-gNB | towards the UE, and acting as secondary node in EN-DC |
| E-UTRA | evolved universal terrestrial radio access, i.e., the LTE radio access technology |
| FDMA | frequency division multiple access |
| f(n) | fixed-pattern bit string using n bits written (from left to right) with the left bit first. |

| | |
|---|---|
| F1 or F1-C | interface between CU and DU control interface |
| gNB (or gNodeB) | base station for 5G/NR, i.e., a node providing NR user plane and control plane protocol terminations towards the UE, and connected via the NG interface to the 5GC |
| GSM | Global System for Mobile communications |
| H.222.0 | MPEG-2 Systems is formally known as ISO/IEC 13818-1 and as ITU-T Rec. H.222.0 |
| H.26x | family of video coding standards in the domain of the ITU-T |
| HLS | high level syntax |
| IBC | intra block copy |
| ID | identifier |
| IEC | International Electrotechnical Commission |
| IEEE | Institute of Electrical and Electronics Engineers |
| I/F | interface |
| IMD | integrated messaging device |
| IMS | instant messaging service |
| IoT | internet of things |
| IP | internet protocol |
| ISO | International Organization for Standardization |
| ISOBMFF | ISO base media file format |
| ITU | International Telecommunication Union |
| ITU-T | ITU Telecommunication Standardization Sector |
| LTE | long-term evolution |
| LZMA | Lempel-Ziv-Markov chain compression |
| LZMA2 | simple container format that can include both uncompressed data and LZMA data |
| LZO | Lempel-Ziv-Oberhumer compression |
| LZW | Lempel-Ziv-Welch compression |
| MAC | medium access control |
| mdat | MediaDataBox |
| MME | mobility management entity |
| MMS | multimedia messaging service |
| moov | MovieBox |
| MP4 | file format for MPEG-4 Part 14 files |
| MPEG | moving picture experts group |
| MPEG-2 | H.222/H.262 as defined by the ITU |
| MPEG-4 | audio and video coding standard for ISO/IEC 14496 |
| MSB | most significant bit |
| NAL | network abstraction layer |
| NDU | NN compressed data unit |
| ng or NG | new generation |
| ng-eNB or NG-eNB | new generation eNB |
| NN | neural network |
| NNEF | neural network exchange format |
| NNR | neural network representation |
| NR | new radio (5G radio) |
| N/W or NW | network |
| ONNX | Open Neural Network eXchange |
| PB | protocol buffers |
| PC | personal computer |
| PDA | personal digital assistant |
| PDCP | packet data convergence protocol |
| PHY | physical layer |
| PID | packet identifier |
| PLC | power line communication |
| PSNR | peak signal-to-noise ratio |
| RAM | random access memory |
| RAN | radio access network |
| RFC | request for comments |
| RFID | radio frequency identification |
| RLC | radio link control |
| RRC | radio resource control |
| RRH | remote radio head |
| RU | radio unit |
| Rx | receiver |
| SDAP | service data adaptation protocol |
| SGW | serving gateway |
| SMF | session management function |
| SMS | short messaging service |
| st(v) | null-terminated string encoded as UTF-8 characters as specified in ISO/IEC 10646 |
| SVC | scalable video coding |
| S1 | interface between eNodeBs and the EPC |
| TCP-IP | transmission control protocol-internet protocol |
| TDMA | time divisional multiple access |
| trak | TrackBox |
| TS | transport stream |
| TV | television |
| Tx | transmitter |
| UE | user equipment |
| ue(v) | unsigned integer Exp-Golomb-coded syntax element with the left bit |
| UICC | Universal Integrated Circuit Card |
| UMTS | Universal Mobile Telecommunications System |
| u(n) | unsigned integer using n bits |
| UPF | user plane function |
| URI | uniform resource identifier |
| URL | uniform resource locator |
| UTF-8 | 8-bit Unicode Transformation Format |
| WLAN | wireless local area network |
| X2 | interconnecting interface between two eNodeBs in LTE network |
| Xn | interface between two NG-RAN nodes |

Figure 2:
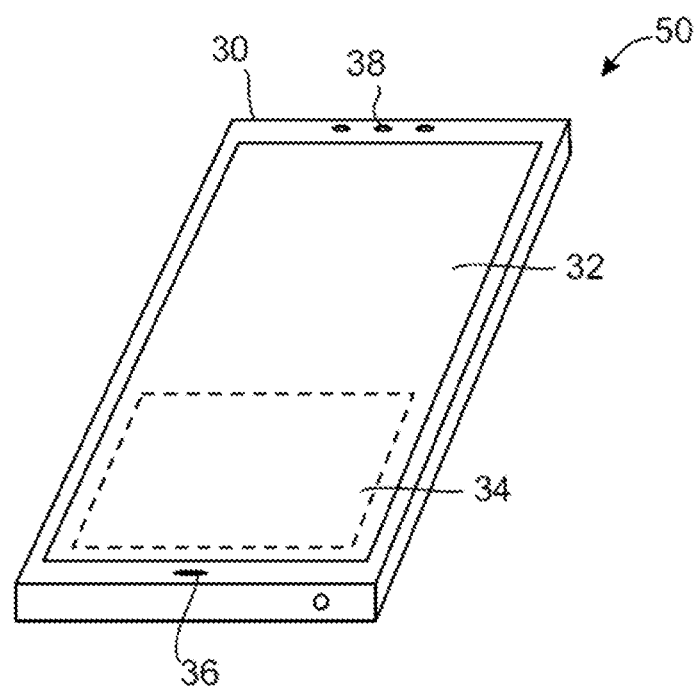
FIG. 2 shows schematically a user equipment suitable for employing embodiments of the examples described herein.

The following describes in detail suitable apparatus and possible mechanisms for an image, or a neural network model encoding process according to embodiments. In some embodiments, the encoding process may include a process for compressing the video, the image, or the neural network model. In this regard reference is first made to FIG. 1 and FIG. 2, where FIG. 1 shows an example block diagram of an apparatus 50. The apparatus may be an Internet of Things (IoT) apparatus configured to perform various functions, such as for example, gathering information by one or more sensors, receiving, or transmitting information, analyzing information gathered or received by the apparatus, or the like. The apparatus may comprise a video coding system, which may incorporate a codec. FIG. 2 shows a layout of an apparatus according to an example embodiment. The elements of FIG. 1 and FIG. 2 will be explained next.

The electronic device 50 may for example be a mobile terminal or user equipment of a wireless communication system, a sensor device, a tag, or other lower power device. However, it would be appreciated that embodiments of the examples described herein may be implemented within any electronic device or apparatus which may process data by neural networks.

The apparatus 50 may comprise a housing 30 for incorporating and protecting the device. The apparatus 50 further may comprise a display 32 in the form of a liquid crystal display. In other embodiments of the examples described herein the display 32 may be in the form of an organic light emitting diode (OLED), a thin film transistor (TFT), an active matrix light emitting diode (AMOLED), a super AMOLED, and the like, or any display technology suitable to display an image or video. The apparatus 50 may further comprise a keypad 34. In other embodiments of the examples described herein any suitable data or user interface mechanism may be employed. For example the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device which in embodiments of the examples described herein may be any one of: an earpiece 38, speaker, or an analogue audio or digital audio output connection. The apparatus 50 may also comprise a battery (or in other embodiments of the examples described herein the device may be powered by any suitable mobile energy device such as solar cell, fuel cell or clockwork generator). The apparatus may further comprise a camera capable of recording or capturing images and/or video. The apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56, processor or processor circuitry for controlling the apparatus 50. The controller 56 may be connected to memory 58 which in embodiments of the examples described herein may store both data in the form of image, video, and audio data; and/or may also store instructions for implementation on the controller 56. The controller 56 may further be connected to codec circuitry 54 suitable for carrying out coding and/or decoding of audio and/or video data or assisting in coding and/or decoding carried out by the controller.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals, for example, for communication with a cellular communications network, a wireless communications system, or a wireless local area network. The apparatus 50 may further comprise an antenna 44 connected to the radio interface circuitry 52 for transmitting radio frequency signals generated at the radio interface circuitry 52 to other apparatus(es) and/or for receiving radio frequency signals from other apparatus(es).

The apparatus 50 may comprise a camera capable of recording or detecting individual frames which are then passed to the codec 54 or the controller for processing. The apparatus may receive the video image data for processing from another device prior to transmission and/or storage. The apparatus 50 may also receive either wirelessly or by a wired connection the image for coding/decoding. The structural elements of apparatus 50 described above represent examples of means for performing a corresponding function.

Figure 3:
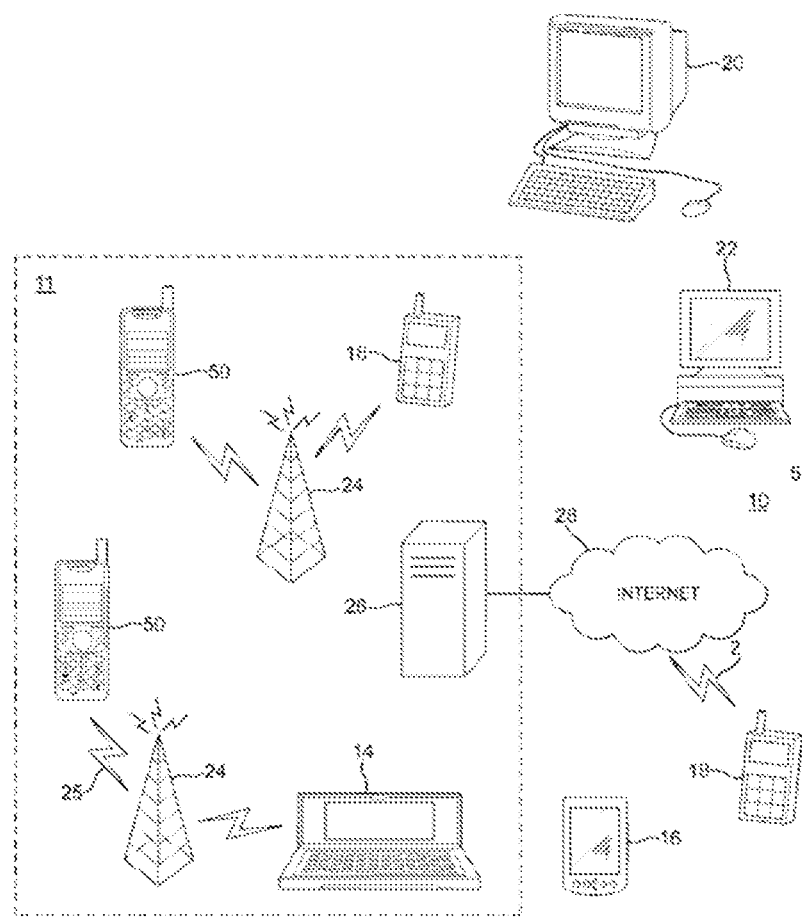
FIG. 3 further shows schematically electronic devices employing embodiments of the examples described herein connected using wireless and wired network connections.

With respect to FIG. 3, an example of a system within which embodiments of the examples described herein can be utilized is shown. The system 10 comprises multiple communication devices which can communicate through one or more networks. The system 10 may comprise any combination of wired or wireless networks including, but not limited to, a wireless cellular telephone network (such as a GSM, UMTS, CDMA, LTE, 4G, 5G network, and the like), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices and/or apparatus 50 suitable for implementing embodiments of the examples described herein.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or the apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located or comprised in a mode of transport including, but not limited to, a car, a truck, a taxi, a bus, a train, a boat, an airplane, a bicycle, a motorcycle, or any similar suitable mode of transport.

The embodiments may also be implemented in a set-top box; for example, a digital TV receiver, which may/may not have a display or wireless capabilities, in tablets or (laptop) personal computers (PC), which have hardware and/or software to process neural network data, in various operating systems, and in chipsets, processors, DSPs and/or embedded systems offering hardware/software based coding.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11, 3GPP Narrowband IoT and any similar wireless communication technology. A communications device involved in implementing various embodiments of the examples described herein may communicate using various media including, but not limited to, radio, infrared, laser, cable connections, and any suitable connection.

In telecommunications and data networks, a channel may refer either to a physical channel or to a logical channel. A physical channel may refer to a physical transmission medium such as a wire, whereas a logical channel may refer to a logical connection over a multiplexed medium, capable of conveying several logical channels. A channel may be used for conveying an information signal, for example a bitstream, from one or several senders (or transmitters) to one or several receivers.

The embodiments may also be implemented in so-called IoT devices. The Internet of Things (IoT) may be defined, for example, as an interconnection of uniquely identifiable embedded computing devices within the existing Internet infrastructure. The convergence of various technologies has and may enable many fields of embedded systems, such as wireless sensor networks, control systems, home/building automation, and the like, to be included the Internet of Things (IoT). In order to utilize Internet IoT devices are provided with an IP address as a unique identifier. IoT devices may be provided with a radio transmitter, such as WLAN or Bluetooth transmitter or a RFID tag. Alternatively, IoT devices may have access to an IP-based network via a wired network, such as an Ethernet-based network or a power-line connection (PLC).

An MPEG-2 transport stream (TS), specified in ISO/IEC 13818-1 or equivalently in ITU-T Recommendation H.222.0, is a format for carrying audio, video, and other media as well as program metadata or other metadata, in a multiplexed stream. A packet identifier (PID) is used to identify an elementary stream (a.k.a. packetized elementary stream) within the TS. Hence, a logical channel within an MPEG-2 TS may be considered to correspond to a specific PID value.

Available media file format standards include ISO base media file format (ISO/IEC 14496-12, which may be abbreviated ISOBMFF) and file format for NAL unit structured video (ISO/IEC 14496-15), which derives from the ISOBMFF.

Video codec consists of an encoder that transforms the input video into a compressed representation suited for storage/transmission and a decoder that can decompress the compressed video representation back into a viewable form. A video encoder and/or a video decoder may also be separate from each other, for example, need not form a codec. Typically, an encoder discards some information in the original video sequence in order to represent the video in a more compact form (e.g., at lower bitrate).

Typical hybrid video encoders, for example, many encoder implementations of ITU-T H.263 and H.264, encode the video information in two phases. Firstly, pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly, the prediction error, for example, the difference between the predicted block of pixels and the original block of pixels, is coded. This is typically done by transforming the difference in pixel values using a specified transform (for example, Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

In temporal prediction, the sources of prediction are previously decoded pictures (a.k.a. reference pictures). In intra block copy (IBC; a.k.a. intra-block-copy prediction and current picture referencing), prediction is applied similarly to temporal prediction, but the reference picture is the current picture and only previously decoded samples can be referred in the prediction process. Inter-layer or inter-view prediction may be applied similarly to temporal prediction, but the reference picture is a decoded picture from another scalable layer or from another view, respectively. In some cases, inter prediction may refer to temporal prediction only, while in other cases inter prediction may refer collectively to temporal prediction and any of intra block copy, inter-layer prediction, and inter-view prediction provided that they are performed with the same or similar process than temporal prediction. Inter prediction or temporal prediction may sometimes be referred to as motion compensation or motion-compensated prediction.

Inter prediction, which may also be referred to as temporal prediction, motion compensation, or motion-compensated prediction, reduces temporal redundancy. In inter prediction, the sources of prediction are previously decoded pictures. Intra prediction utilizes the fact that adjacent pixels within the same picture are likely to be correlated. Intra prediction can be performed in spatial or transform domain, for example, either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

Figure 4:
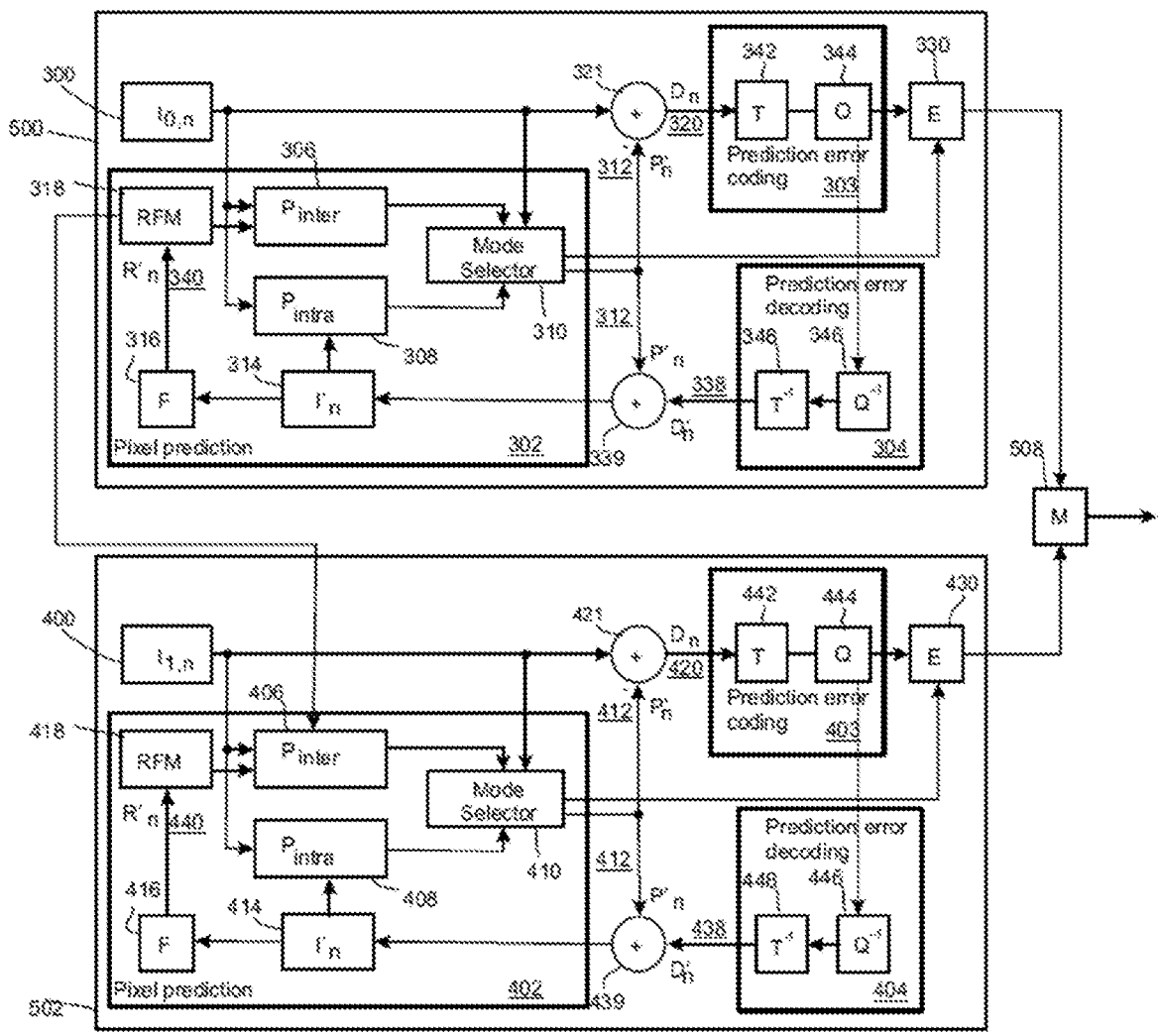
FIG. 4 shows schematically a block chart of an encoder on a general level.

FIG. 4 shows a block diagram of a general structure of a video encoder. FIG. 4 presents an encoder for two layers, but it would be appreciated that presented encoder could be similarly extended to encode more than two layers. FIG. 4 illustrates a video encoder comprising a first encoder section 500 for a base layer and a second encoder section 502 for an enhancement layer. Each of the first encoder section 500 and the second encoder section 502 may comprise similar elements for encoding incoming pictures. The encoder sections 500, 502 may comprise a pixel predictor 302, 402, prediction error encoder 303, 403 and prediction error decoder 304, 404. FIG. 4 also shows an embodiment of the pixel predictor 302, 402 as comprising an inter-predictor 306, 406, an intra-predictor 308, 408, a mode selector 310, 410, a filter 316, 416, and a reference frame memory 318, 418. The pixel predictor 302 of the first encoder section 500 receives 300 base layer images of a video stream to be encoded at both the inter-predictor 306 (which determines the difference between the image and a motion compensated reference frame 318) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the base layer picture 300. Correspondingly, the pixel predictor 402 of the second encoder section 502 receives 400 enhancement layer images of a video stream to be encoded at both the inter-predictor 406 (which determines the difference between the image and a motion compensated reference frame 418) and the intra-predictor 408 (which determines a prediction for an image block based only on the already processed parts of current frame or picture). The output of both the inter-predictor and the intra-predictor are passed to the mode selector 410. The intra-predictor 408 may have more than one intra-prediction modes. Hence, each mode may perform the intra-prediction and provide the predicted signal to the mode selector 410. The mode selector 410 also receives a copy of the enhancement layer picture 400.

Depending on which encoding mode is selected to encode the current block, the output of the inter-predictor 306, 406 or the output of one of the optional intra-predictor modes or the output of a surface encoder within the mode selector is passed to the output of the mode selector 310, 410. The output of the mode selector is passed to a first summing device 321, 421. The first summing device may subtract the output of the pixel predictor 302, 402 from the base layer picture 300/enhancement layer picture 400 to produce a first prediction error signal 320, 420 which is input to the prediction error encoder 303, 403.

The pixel predictor 302, 402 further receives from a preliminary reconstructor 339, 439 the combination of the prediction representation of the image block 312, 412 and the output 338, 438 of the prediction error decoder 304, 404. The preliminary reconstructed image 314, 414 may be passed to the intra-predictor 308, 408 and to a filter 316, 416. The filter 316, 416 receiving the preliminary representation may filter the preliminary representation and output a final reconstructed image 340, 440 which may be saved in a reference frame memory 318, 418. The reference frame memory 318 may be connected to the inter-predictor 306 to be used as the reference image against which a future base layer picture 300 is compared in inter-prediction operations. Subject to the base layer being selected and indicated to be source for inter-layer sample prediction and/or inter-layer motion information prediction of the enhancement layer according to some embodiments, the reference frame memory 318 may also be connected to the inter-predictor 406 to be used as the reference image against which a future enhancement layer pictures 400 is compared in inter-prediction operations. Moreover, the reference frame memory 418 may be connected to the inter-predictor 406 to be used as the reference image against which a future enhancement layer picture 400 is compared in inter-prediction operations.

Filtering parameters from the filter 316 of the first encoder section 500 may be provided to the second encoder section 502 subject to the base layer being selected and indicated to be source for predicting the filtering parameters of the enhancement layer according to some embodiments.

The prediction error encoder 303, 403 comprises a transform unit 342, 442 and a quantizer 344, 444. The transform unit 342, 442 transforms the first prediction error signal 320, 420 to a transform domain. The transform is, for example, the DCT transform. The quantizer 344, 444 quantizes the transform domain signal, for example, the DCT coefficients, to form quantized coefficients.

The prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414. The prediction error decoder may be considered to comprise a dequantizer 346, 446, which dequantizes the quantized coefficient values, for example, DCT coefficients, to reconstruct the transform signal and an inverse transformation unit 348, 448, which performs the inverse transformation to the reconstructed transform signal wherein the output of the inverse transformation unit 348, 448 contains reconstructed block(s). The prediction error decoder may also comprise a block filter which may filter the reconstructed block(s) according to further decoded information and filter parameters.

The entropy encoder 330, 430 receives the output of the prediction error encoder 303, 403 and may perform a suitable entropy encoding/variable length encoding on the signal to provide error detection and correction capability. The outputs of the entropy encoders 330, 430 may be inserted into a bitstream, for example, by a multiplexer 508.

Figure 5:
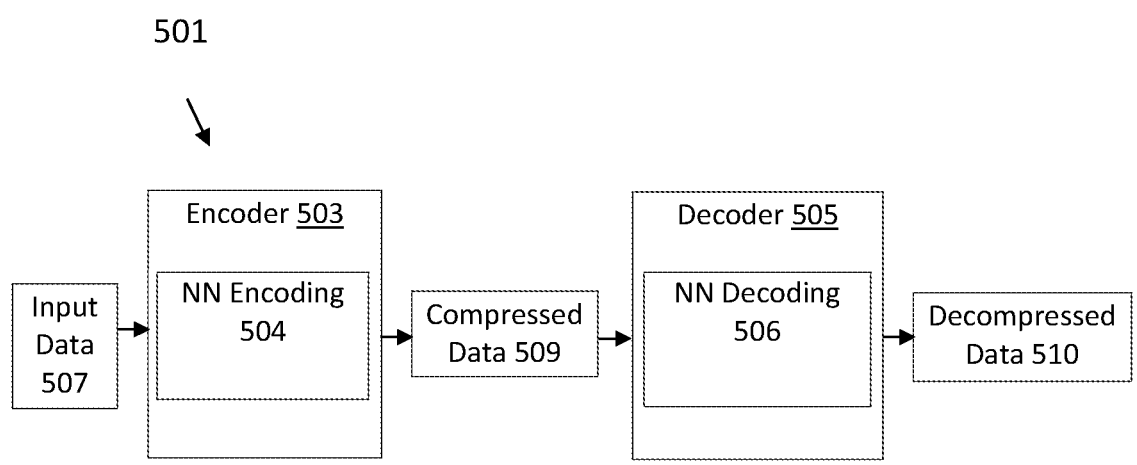
FIG. 5 is a block diagram showing the interface between an encoder and a decoder in accordance with the examples described herein.

FIG. 5 is a block diagram 501 showing the interface between an encoder 503 implementing a neural network encoding 504, and a decoder 505 implementing a neural network decoding 506 in accordance with the examples described herein. The encoder 503 may embody a device, software method or hardware circuit. The encoder 503 has the goal of compressing input data 507 (for example, an input video) to compressed data 509 (for example, a bitstream) such that the bitrate is minimized, and the accuracy of an analysis or processing algorithm is maximized. To this end, the encoder 503 uses an encoder or compression algorithm, for example to perform the neural network encoding 504. The encoder 503 may for example include the first encoder section 500, a second encoder section 502, or combination thereof. In some embodiments, the neural network encoding process may include process for compressing.

The general analysis or processing algorithm may be part of the decoder 505. The decoder 505 uses a decoder or decompression algorithm, for example, to perform the neural network decoding 506 to decode the compressed data 509 (for example, compressed video) which was encoded by the encoder 503. The decoder 505 produces decompressed data 510 (for example, reconstructed data).

The encoder 503 and the decoder 505 may be entities implementing an abstraction, may be separate entities or the same entities, or may be part of the same physical device.

The analysis/processing algorithm may be any algorithm, traditional or learned from data. In the case of an algorithm which is learned from data, it is assumed that this algorithm can be modified or updated, for example using optimization via gradient descent. One example of the learned algorithm is a neural network.

MPEG Compression of Neural Networks (NNR) Standardization. MPEG is currently pursuing standardization of representations for compressed neural networks in the standardization group called neural network representations (NNR).

A draft of the NNR Standard specification (may also be referred to as the draft) has been prepared during the MPEG NNR meetings. The HLS included in the draft comprises a basic structure for the organization of the bitstream. According to this structure, the NNR bitstream is splitted into elemental units termed NNR Units. The NNR Unit represents a basic high-level syntax structure, and contains three syntax elements: NNR Unit Size, NNR Unit Header, NNR Unit Payload. A bitstream is formed by concatenating several NNR Units. NNR Units may contain different types of data. The type of data that is contained in the payload of an NNR Unit defines the NNR Unit's type. This type maybe further indicated in the NNR Unit Header. The following table specifies the NNR unit header types and their identifiers.

| NNR Unit Type | Description | NNR Unit Heade rType identifier |
| --- | --- | --- |
| Model parameter set data unit | NN level global metadata | NNR_MPS |
| Layer parameter set data unit | Layer level metadata | NNR_LPS |
| NN Topology or graph data unit | NN topology or graph information (could be in non-MPEG defined format, for example, NNEF) | NNR_TPL |
| NN Quantization data unit | Quantization information | NNR_QNT |
| NNR Compressed data unit | NNR compressed NN data | NNR_NDU |
| NN Compressed neural network data start unit | NNR compressed bitstream start indicator | NNR_STR |
| Aggregate data unit | NNR unit that contains a set of NNR Units | NNR_AGG |

However, no detailed structure was decided regarding the content and bitstream syntax of each of these NNR Units. The examples described herein, propose bitstream syntax definitions for some of these NNR Units in order to achieve, for example, interoperability between a sender and receiver of such information.

Open Neural Network eXchange. ONNX is an open ecosystem for interchangeable models that is developed by community of partners. ONNX facilitates mechanism for defining deep learning neural networks as computation over dataflow graphs. It, thus, provides the foundations required for the definition of:

Extensible computation graph model
Standard data types
Built-in operators

The model file associates metadata with a graph, and it's used when first reading the model file to understand whether the runtime environment is able to run the model (for example, checking whether all operators are supported).

The data is stored in a file format which is based on protocol puffers (PB). PB is a programming language and platform independent serialization mechanism (but not human-readable). Network's data is stored in .proto or .proto3 files. Data in these files is stored as "messages". These files are then compiled into language-specific classes. By using such classes and the model definition (which is stored in a .onnx file), a platform can then run the model.

ISO base media file format. Available media file format standards include ISO base media file format (ISO/IEC 14496-12, which may be abbreviated ISOBMFF), MPEG-4 file format (ISO/IEC 14496-14, also known as the MP4 format), file format for NAL (Network Abstraction Layer) unit structured video (ISO/IEC 14496-15) and 3GPP file format (3GPP TS 26.244, also known as the 3GP format). ISOBMFF is the base for derivation of all the above mentioned file formats (excluding the ISOBMFF itself).

Some concepts, structures, and specifications of ISOBMFF are described below as an example of a container file format, based on which the embodiments may be implemented. The embodiments of the invention are not limited to ISOBMFF, but rather the description is given for one possible basis on top of which the embodiments of the invention may be partly or fully realized.

A basic building block in the ISO base media file format is called a box. Each box has a header and a payload. The box header indicates the type of the box and the size of the box in terms of bytes. A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes.

According to the ISO base media file format, a file includes media data and metadata that are encapsulated into boxes. Each box is identified by a four character code (4CC) and starts with a header which informs about the type and size of the box.

In files conforming to the ISO base media file format, the media data may be provided in one or more instances of MediaDataBox ('mdat') and the MovieBox ('moov') may be used to enclose the metadata for timed media. In some cases, for a file to be operable, both of the 'mdat' and 'moov' boxes may be required to be present. The 'moov' box may include one or more tracks, and each track may reside in one corresponding TrackBox ('trak'). Each track is associated with a handler, identified by a four-character code, specifying the track type. Video, audio, and image sequence tracks can be collectively called media tracks, and they contain an elementary media stream. Other track types comprise hint tracks and timed metadata tracks.

Tracks comprise samples, such as audio or video frames. For video tracks, a media sample may correspond to a coded picture or an access unit. A media track refers to samples (which may also be referred to as media samples) formatted according to a media compression format (and its encapsulation to the ISO base media file format). A hint track refers to hint samples, containing cookbook instructions for constructing packets for transmission over an indicated communication protocol. A timed metadata track may refer to samples describing referred media and/or hint samples.

Movie fragments may be used, for example, when recording content to ISO files, for example, in order to avoid losing data if a recording application crashes, runs out of memory space, or some other incident occurs. Without movie fragments, data loss may occur because the file format may require that all metadata, for example, the movie box, be written in one contiguous area of the file. Furthermore, when recording a file, there may not be sufficient amount of memory space (for example, random access memory RAM) to buffer a movie box for the size of the storage available, and re-computing the contents of a movie box when the movie is closed may be too slow. Moreover, movie fragments may enable simultaneous recording and playback of a file using a regular ISO file parser. Furthermore, a smaller duration of initial buffering may be required for progressive downloading, for example, simultaneous reception and playback of a file when movie fragments are used, and the initial movie box is smaller compared to a file with the same media content but structured without movie fragments.

The movie fragment feature may enable splitting the metadata that otherwise might reside in the movie box into multiple pieces. Each piece may correspond to a certain period of time of a track. In other words, the movie fragment feature may enable interleaving file metadata and media data. Consequently, the size of the movie box may be limited, and the use cases mentioned above be realized.

In some examples, the media samples for the movie fragments may reside in an mdat box. For the metadata of the movie fragments, however, a moof box may be provided. The moof box may include the information for a certain duration of playback time that would previously have been in the moov box. The moov box may still represent a valid movie on its own, but in addition, it may include an mvex box indicating that movie fragments will follow in the same file. The movie fragments may extend the presentation that is associated to the moov box in time.

Within the movie fragment there may be a set of track fragments, including anywhere from zero to a plurality per track. The track fragments may in turn include anywhere from zero to a plurality of track runs, each of which document is a contiguous run of samples for that track (and hence are similar to chunks). Within these structures, many fields are optional and can be defaulted. The metadata that may be included in the moof box may be limited to a subset of the metadata that may be included in a moov box and may be coded differently in some cases. Details regarding the boxes that can be included in a moof box may be found from the ISOBMFF specification.

A self-contained movie fragment may be defined to consist of a moof box and an mdat box that are consecutive in the file order and where the mdat box contains the samples of the movie fragment (for which the moof box provides the metadata) and does not contain samples of any other movie fragment (for example, any other moof box).

A media segment may comprise one or more self-contained movie fragments. A media segment may be used for delivery, such as streaming, for example, in MPEG-DASH.

The track reference mechanism can be used to associate tracks with each other. The TrackReferenceBox includes box(es), each of which provides a reference from the containing track to a set of other tracks. These references are labelled through the box type (for example, the four-character code of the contained box(es).

The ISO Base Media File Format contains three mechanisms for timed metadata that can be associated with particular samples: sample groups, timed metadata tracks, and sample auxiliary information. Derived specification may provide similar functionality with one or more of these three mechanisms.

A sample grouping in the ISO base media file format and its derivatives, such as the AVC file format and the SVC file format, may be defined as an assignment of each sample in a track to be a member of one sample group, based on a grouping criterion. A sample group in a sample grouping is not limited to being contiguous samples and may contain non-adjacent samples. As there may be more than one sample grouping for the samples in a track, each sample grouping may have a type field to indicate the type of grouping. Sample groupings may be represented by two linked data structures: (1) a SampleToGroupBox (sbgp box) represents the assignment of samples to sample groups; and (2) a SampleGroupDescriptionBox (sgpd box) contains a sample group entry for each sample group describing the properties of the group. There may be multiple instances of the SampleToGroupBox and SampleGroupDescriptionBox based on different grouping criteria. These may be distinguished by a type field used to indicate the type of grouping. SampleToGroupBox may comprise a grouping_type_parameter field that can be used, for example, to indicate a sub-type of the grouping.

MPEG Compressed Representation of Neural Networks standard (MPEG NNR-ISO/IEC 15938-17) aims to provide a standardized way to compress and distribute "neural networks" (in some example embodiments may be referred to as NNs). This is an important aspect in the era of AI-enabled IoT (AIoT) devices and ecosystems where billions of connected internet of things devices will be smart and have AI components, for example, connected cars, home automation systems, smartphones, cameras, industrial machines, and the like.

MPEG NNR standardization activity currently works on defining compression tools for neural networks. However, from systems point of view, compressed representations of neural networks require transmission over lossy or lossless channels, mostly via IP communication. In order to support such transmission or exchange of NN data, a high-level syntax definition and format is required.

Currently such a high-level syntax for compressed neural networks is under development in MPEG context and missing many aspects of an interoperable information exchange mechanism, carriage of configuration and parameters related to the exchanged data of compressed neural networks.

Several "exchange formats" are defined by the industry. ONNX (https://onnx.ai/) or NNEF (https://www.khronois.org/nnef) could be listed as the two most well-known ones. However, they lack any compression aspect of neural networks, nor do they define a flexible and well-structured high level syntax for such compressed NN data. They provide topology information and links from topology elements to neural network weights and/or coefficients.

MPEG NNR has the following use cases which need to be addressed by a possible high-level bitstream syntax in general:

Transfer of whole or partial neural networks (for example, layer by layer)
  Partial update of a neural network in time
  Provision of information about certain characteristics of compressed neural network (for example, accuracy, compression method, compression ratio, and the like)
  Access to the compressed neural network representation in a progressive manner
  Re-usable weights or portions of neural network (in many cases, only the initial layers of a neural network are used, such as when that neural network is used only as a feature extractor and the extracted features are used by other neural networks or other neural networks' portions).
  Retraining and Federated learning of neural networks An initial basic structure for NNR HLS was included into the draft of the NNR standard. Various embodiments of the present invention introduce a set of extensions to that basic high-level syntax.

Various embodiments described herein disclose several NNR high-level syntax elements for some of the NNR Unit types that are currently specified in the draft of the MPEG NNR standard. Syntax definitions for at least the following elements are disclosed:

Pipeline of Decoding Steps;
  Quantization Method;
  Update Mode;
  Sparsification-to-Performance Mapping;
  Context Reset;
  Context Mode;
  Context ID; and
  Extensions to support ONNX file format.

Various embodiments described herein enable signaling and storage of necessary parameters and configurations for the above-mentioned examples of the high level syntax elements of MPEG NNR.

Although the draft of NNR includes a high-level syntax definition for storage of certain neural network parameters and configurations, it does not provide the needed detailed parameters and signaling mechanisms for various aspects of compressed neural networks. In order to cover these and other example features, the following signaling, and configuration extensions are proposed:

Extension 1: Pipeline of Decoding Units. The NNR encoder may perform different compression steps for different input neural networks to be compressed. Differences may, for example, be in:

Examples for the order of compression steps may be, but not limited to, as follows:
    Example order 1: Sparsification→Matrix Decomposition→Quantization→Entropy Coding
    Example order 2: Matrix Decomposition→Sparsification→Quantization→Entropy Coding
    Example order 3: Weight Unification→Entropy Coding
    Example order 4: Sparsification→Quantization→Entropy Coding
  Examples for the types of compression steps may be, but not limited to, as follows:
    Example type 1: sparsification and other parameter reduction schemes.
    Example type 2: quantization and weight-unification.
    Example type 3: entropy coding and other lossless coding steps.
  Additionally, there may be a need to signal whether a compression (and decompression) step is required or not.

The decoder may need to operate according to the type and order of the encoding steps. As these may change for each neural network, a mechanism to signal the steps from encoder to decoder may be defined, either in-band or out-of-band of the compressed neural network carriage mechanism.

In one embodiment, this data structure may be carried as part of the NNR topology unit. However, any other syntax element could be a carrier of this information.

The syntax for decoding pipeline may be defined as follows:

|  | Descriptor |
| --- | --- |
| decoding_pipeline( ) { | |
|   count_decoding_steps | u(8) |
|   for(j = 0; j < count_decoding_steps; j++ ) { | |
|     decoding_step_id | u(7) |
|     required_step_flag | u(1) |
|   } | |
| } | |

Semantics of the decoding pipeline may be defined as follows:

count_decoding_steps defines the number of decoding steps performed;

decoding_step_id identifies the decoding process or step to be performed. Several possible values are listed above (sparsification, matrix decomposition, quantization, entropy coding, and the like); and required_step_flag indicates whether or not the decoding process/step defined by decoding_step_id is essential and required for the decoding process.

Extension 2: Quantization Method Identification. quantization_method_ID information may be used to signal the quantization method used for the whole neural network model. This information may be part of the NNR model parameter pet payload in the NNR bitstream. Alternatively, it may specify the quantization method used for a specific part of the model, such as for a whole layer. In such a case, it may be signaled as part of the NNR Layer parameter set payload.

The syntax may be as shown in the following table:

|  | Descriptor |
| --- | --- |
| quantization_method_id | u(8) |

The value may be one of the following enumerated values.

| Quantization method | Quantization method ID | Value |
| --- | --- | --- |
| Scalar uniform | NNR_QSU | 0x01 |
| Scalar non-uniform | NNR_QSN | 0x02 |
| Codebook | NNR_QCB | 0x03 |
| Reserved |  | 0x04-0xFF |

In some embodiments, the above table may be extended with new quantization methods and possible IDs and enumeration values are given as example.

Extension 3: Information Signaling on NN Update Mode nn_update_mode information may specify whether the compressed data in the NNR bitstream replaces a previously signalled or present data in the NN or is summed to the previous data in the NN. In particular, nn_update_mode specifies whether the update is to be applied as a replacement or as a sum.

As an example, when set to 0, it may specify that the data in NNR compressed data units may be used for replacing the data of one or more of the topology elements of an NN with ID update_nn_id. When set to 1, it may specify that the data in NNR compressed data units may be added to the data of one or more of the topology elements of an NN with ID update_nn_id. In an alternative embodiment, there may be more than two possible updating modes, which may require using more than one bit for signaling the updating mode.

The syntax may be as shown in the following table:

|  | Descriptor |
| --- | --- |
| nn_update_mode | u(1) |
| update_nn_id | u(7) |
| ref_id | st(v) | update_nn_id specifies the baseline NN data version on top of which to apply the weight-update data carried in the NNR compressed data unit(s). The format may be an alphanumeric identifier.

ref id specifies the baseline NN data version on top of which to apply the weight-update data carried in the NNR compressed data unit(s). The format may be a null terminated string. In one embodiment, either ref_id or update_nn_id is present, instead of both. In another embodiment, a list of update_nn_ids or ref ids may be defined and updated with the same update data.

In another embodiment, an NNR reference Id (in this example it is called ref id) may be defined as well. This reference id may have the same semantics as the update_nn_id, but is a variable length string information.

In the alternate embodiment, nn_update_mode may be extended to include more than two values. An example syntax element, nn_update_operation_mode may be used to represent the extended nn_update_mode. The nn_update_operation_mode information may specify whether the compressed data in the NNR is combined with the previous data in the NN (e.g. combining the weight-update with the previous weights), where the combination operation may be a sum, a subtraction, a multiplication, a division, or any other relevant operation. The combination operation may be predetermined and already known at decoder side, or it may be explicitly signaled for example only once for the NN, or once for each layer, or once for each topology element. The explicit signaling may be done by using a syntax element nn_update_operation_mode, which can take one out of N possible enumerated values.

Extension 4: Signaling of Sparsification-to-Performance Mapping Information. sparsification_performance_map( ) may specify a mapping between different sparsification thresholds and resulting NN inference accuracies. The resulting accuracies are provided separately for different aspects or characteristics of the output of the NN. For a classifier NN, each sparsification threshold may be mapped to separate accuracies for each class, in addition to an overall accuracy which considers all classes. For an object detection NN, each sparsification threshold may be mapped to an accuracy measure for a center of a bounding box and an accuracy measure for a size of the bounding box.

The syntax may be as follows:

| | Descriptor |
|---|---|
| sparsification_performance_map ( ) { | |
|   count_thresholds | u(8) |
|   count_aspects | u(8) |
|   for(i = 0; i < (count_thresholds-1); i++ ) { | |
|     sparsification_threshold | f(32) |
|     non_zero_ratio | f(32) |
|     nn_accuracy | f(32) |
|     for(j = 0; j < (count_aspects-1); j++ ) { | |
|       aspect_id | u(8) |
|       if (aspect_id == NNR_CLS){ | |
|       count_classes | u(8) |
|       for(j = 0; j <(count_classes-1); j++ ) { | |
|         nn_class_accuracy | f(32) |
|       } | |
|     } | |
|     elseif (aspect_id == NNR_BBC){ | |
|     bb_center_accuracy | f(32) |
|     } | |
|     elseif (aspect_id == NNR_BBH){ | |
|     bb_height_accuracy | f(32) |
|     } | |
|     elseif (aspect_id == NNR_BBW){ | |
|     bb_width_accuracy | f(32) |
|     } | |
|   } | |
|   dataset_id( ) | u(8) |
| } | |

In an embodiment, the syntax may be as follows:

| | Descriptor |
|---|---|
| sparsification_performance_map ( ) { | |
|   count_thresholds | u(8) |
|   count_aspects | u(8) |
|   for(i = 0; i < (count_thresholds-1); i++ ) { | |
|     sparsification_threshold[i] | f(32) |
|     non_zero_ratio[i] | f(32) |
|     nn_accuracy[i] | f(32) |
|     for(j = 0; j <(count_aspects-1); j++ ) { | |
|       aspect_id[i][j] | u(8) |
|       if (aspect_id[i][j] == NNR_CLS){ | |
|       count_classes[i] | u(8) |
|       for(k = 0; k < (count_classes[i]-1); k++ ) { | |
|         nn_class_accuracy[i][k] | f(32) |
|       } | |
|     } | |
|     elseif (aspect_id[i][j] == NNR_BBC){ | |
|     bb_center_accuracy[i] | f(32) |
|     } | |
|     elseif (aspect_id[i][j] == NNR_BBH){ | |
|     bb_height_accuracy[i] | f(32) |
|     } | |
|     elseif (aspect_id[i][j] == NNR_BBW){ | |
|     bb_width_accuracy[i] | f(32) |
|     } | |
|     } | |
|   } | |
|   dataset_id( ) | u(8) |
| } | |

The semantics may be defined as follows:

count_thresholds specifies the number of sparsification thresholds.

count_aspects specifies the number of aspects of the output of the NN for which separate accuracies are provided. For example, for a classifier NN, count_aspects can be the number of classes for which separate accuracies are provided. This can be different from the total number of classes considered by the NN. In another example, for a classifier NN, count_aspects can be 1, which refers to the fact that classification accuracy is provided for one or more classes. For an object detection NN, count_aspects can be 3, for example, the center, the height and the width of the bounding box.

Sparsification_threshold specifies the threshold which is applied to the weights of the decoded neural network in order to set the weights to zero. For example, the weights whose values are less than the threshold are set to zero.

non_zero_ratio specifies the non-zero ratio that is achieved by applying the sparsification_threshold to sparsify the weights.

nn_accuracy specifies the overall accuracy of the NN (for example, classification accuracy by considering all classes).

aspect_id specifies an ID for the aspect of the output of the NN for which a separate accuracy is associated to a sparsification threshold.

In another embodiment, instead of 'count_thresholds-1', 'count_aspects-1', 'count_classes-1', the exact values of these syntax elements (e.g. 'count_thresholds', 'count_aspects', or count_classes) may be used.

In another embodiment, a syntax element which maps the index of the present accuracy value to the index of the corresponding class of the neural network may be defined.

Such a class mapping may be indicated by a class index and such index may be included together with the class accuracy values. An example syntax element may be defined as following:

| | |
|---|---|
| ... (index i defined above) | |
| for (k = 0; k < (count_classes[i]-1); k++ ) | |
|   class_index[i][k] | u(16) |
|   class_accuracy[i][k] | flt(32) |
| } | |
| ... | |

Where class_index[i][k] indicates the class index for which accuracy information is provided in the current iteration of the loop, and class_accuracy[i] [k] indicates the accuracy of class with index indicated by class_index[i][k], and. In an embodiment, class_index[i][k] is present only if not all class accuracies are signaled and present.

In an embodiment, a bitmap may be used, where each bit location in the bitmap may correspond to an output class of the neural network. In an embodiment, the most-significant bit of the bitmap corresponds to the smallest class index or alternatively the biggest class index. The following example syntax element, called class_bitmap, and related data structure may be signaled:

| | |
|---|---|
| ... (index i defined above) | |
| class_bitmap | ue(8) |
| for (j = 0; j <(count_classes-1); j++ ) | |
|   class_accuracy[i][j] | flt(32) |
| } | |
| ... | |

Alternatively, an array of bytes may be used to represent a class_bitmap. The concatenated bytes from MSB may represent first class and LSB may represent the last class, excluding byte alignment related extra LSB bits, or vice-versa in the bit order.

In another embodiment, information about accuracies for all classes may be signaled and a pre-defined value may be utilized to indicate not-applicable or unknown accuracy value. An example of such a value may be 0xffff in a 32-bit data structure. The following data structure may be signaled:

| sparsification_performance_map( ) { | Descriptor |
|---|---|
| ... | |
| count_classes | ue(8) |
| for(i = 0; i < (count_thresholds−1); i++ ) { | |
|     sparsification_threshold[i] | flt(32) |
|     non_zero_ratio[i] | flt(32) |
|     nn_accuracy[i] | flt(32) |
|     for (k = 0; k < (count_classes[i]−1); k++ ) | |
|         nn_class_accuracy[i][k] | flt(32) |
| } | |
| ... | |
| } | |

Where count_classes indicate the number of output classes of the neural network, nn_class_accuracy indicates the class accuracy value, and where a pre-determined value may indicate an unknown or not-applicable value. An example for pre-determined value may be 0xffff in hexadecimal format.

An example enumeration of IDs for the aspect_id, for the cases of object detection and classification neural networks is as follows:

| Aspect | Aspect Identifier | Type enumeration (maybe 1 byte) |
|---|---|---|
| Bounding box center | NNR_BBC | 0x00 |
| Bounding box height | NNR_BBH | 0x01 |
| Bounding box width | NNR_BBW | 0x02 |
| Classes | NNR_CLS | 0x03 |
| reserved | | 0x04-0xFF | count_classes specifies number of classes for which separate accuracies are provided for each sparsification thresholds.

nn_class_accuracy specifies the accuracy for a certain class, when a certain sparsification threshold is applied.

bb_center accuracy specifies the accuracy for the center of bounding boxes for object detection.

bb_height accuracy specifies the accuracy for the height of bounding boxes for object detection.

bb_width accuracy specifies the accuracy for the width of bounding boxes for object detection.

Extension 5: Signaling of Entropy or Arithmetic Coding Related Context Reset. context_reset_flag may specify whether the context for entropy or arithmetic coding (for example, but not limited to, CABAC-decoding) needs to be reset when decoding the current kernel or layer or any data contained in an NNR compressed data unit.

context_reset_flag may be signaled in the NNR unit header of NNR compressed data units. In an embodiment, context_reset_flag may also be signaled in the NNR unit header of NNR Aggregated Data Unit. In another embodiment, it may be signaled in the layer parameter set.

The syntax may be as shown in the following table:

| | Descriptor |
|---|---|
| context_reset_flag | u(1) |

Extension 6: Context Mode Signaling. context_mode may specify whether the context for entropy or arithmetic coding (for example, CABAC-decoding) of current layer or kernel is the spatially-neighboring and previously decoded symbols (as an example, when set to 0) or the symbols at same spatial location in previously decoded layers or kernels (as an example, when set to 1). The latter option (when context_mode is set to 1) considers the case where weights in different layers are very similar.

The syntax may be as shown in the following table:

| | Descriptor |
|---|---|
| context_mode | u(1) |

A combination of the two modes may also be possible, and it would represent an additional mode. Additional context modes may also be defined. Therefore, the context_mode descriptor type may consist of more than 1 bit.

The following is one example where a certain symbol related to a weight of a convolutional kernel is being entropy decoded. If the kernel is of size 3×3, the current symbol being decoded may be the second weight in the kernel, by assuming a certain scanning order such as raster scan. When context_mode is set to 0, the context for decoding is the symbols related to the same kernel and/or same layer which were previously decoded, such as the first weight in the current kernel. When context_mode is set to 1, the context for decoding is the symbols at same location within the kernel but in other layers which were previously decoded, that is, the symbol related to the second weight in the kernel of a previously decoded layer.

Extension 7: Signaling Decoding Context Information. Decoding context information may comprise context_ID. context_ID specifies which layer or kernel which has been previously decoded is to be used as context for entropy or arithmetic coding (for example, CABAC-decoding) the current layer or kernel, if context_mode is set to 1, then it may specify the context id for the current layer or kernel.

The syntax may be as shown in the following table:

| | Descriptor |
|---|---|
| context_ID | u(8) |

Extension 8: Signalling of Unique Identifiers for Layer Parameter Set. lps_id_list is a field in the layer parameter set which may specify an array of unique identifiers which map elements in the NNR compressed data units (to which this layer parameter set refers) to the corresponding topology elements.

The syntax may be as shown in the following table:

| lps_id_list ( ) { | Descriptor |
|---|---|
| count_ids | u(8) |
| for(j = 0; j < count_ids; j++ ) { | |
|     id_name | st(v) |
|     data_type | u(8) |
|     data_size | u(32) |
| } | |
| byte_alignment( ) | |
| } | | count_ids specifies the number of unique identifiers contained in the lps_id_list structure.

id_name provides a unique identifier for the compressed NN data unit element which may span a portion of the compressed data. In an embodiment, such an identifier may correspond to the variable identifiers in NNEF topology graph. The interpretation of this field may be dependent on the compressed data format (for example, NNEF, ONNX, MPEG, and the like).

data_type may be an enumerated data type value. Possible values may be, but not limited to, binary, uint, int, float with 1 bit, 4 bit, 8 bit, 16 bit, 32 bit and 64 bit precisions.

data_size may indicate the number of parameters or weights belong to this id when the compressed N data unit is uncompressed. In another embodiment, this value may indicate the byte size which corresponds to such parameters or weights.

Extension 9: Tensor Dimensions. tensor_dimensions may be a field of the Layer Parameter Set and may specify the dimensions of the tensor to which the layer parameter set refers. In another embodiment, tensor_dimensions may be a field of the NNR compressed data unit's header and may specify the dimensions of the tensor carried in the payload of the same NNR compressed data unit.

The syntax may be as shown in the following table:

| | Descriptor |
|---|---|
| tensor_dimensions( ){ | |
| count_dims | u(8) |
| for(j = 0; j < count_dims; j++){ | |
| dim[j] | u(8) |
| } | |
| } | | count_dims may be a counter of how many dimensions are specified. For example, for a 4-dimensional tensor, count_dims may be 4.

dim may be an array or list of dimension values. For example, for a convolutional layer, dim may be an array or list of length 4.

Extension 10: Signaling the List of Shared Weights. Tpl_list_shared_ids may be a field signalled in a topology NNR unit that may list all the mappings between a unique data element and all the shared identifiers. This is done by including a list of tpl_shared_ids( ).

| tpl_list_shared_ids ( ) { | Descriptor |
|---|---|
| count_ids | u(8) |
| for(j = 0; j < count_ids; j++ ) { | |
| tpl_shared_ids( ) | |
| } | |
| } | | tpl_shared_ids( ) may indicate the mapping between unique identifiers that maps one element in an NNR compressed data unit to several elements in the topology to support shared weights.

| tpl_shared_ids ( ) { | Descriptor |
|---|---|
| count_ids | u(8) |
| unified_id_name | st(v) |
| data_type | u(8) |
| data_size | u(32) |
| for(j = 0; j < count_ids; j++ ) { | |

| | Descriptor |
|---|---|
| tpl_shared_ids ( ) { | |
| id_name | st(v) |
| } | |
| } | | count_ids specifies the number of unique identifiers contained in the tpl_shared_ids structure.

unified_id_name is a unique identifier name for the group of unified elements which share a weight.

data_type may be an enumerated data type value. Possible values could be, but not limited to,: binary, uint, int, float with 1 bit, 4 bit, 8 bit, 16 bit, 32 bit and 64 bit precisions.

data_size may indicate the number of parameters or weights belong to unified_id_name when the compressed N data unit is uncompressed. In another embodiment, this value may indicate the byte size which corresponds to such parameters or weights.

id_name provides the unique identifier of the compressed NN data unit element which may span a portion of the compressed data. In an embodiment, such an identifier may correspond to the variable identifiers in NNEF topology graph. The interpretation of this field may be dependent on the compressed data format, for example, NNEF, ONNX, MPEG, and the like.

Extension 11: Supporting ONNX by using NNR as a carrier of ONNX messages. A new NNR Unit Type may be introduced to indicate that the payload carries ONNX messages.

| Type Identifier | Type enumeration |
|---|---|
| NNR_ONNX | 0x08 |

In this mode of operation, no NNR unit payload format would be defined for NNR Units of type NNR_ONNX and no other type of NNR Units may be carried in the high level bitstream, and ONNX messages may be accepted and provided to other processing steps as it is and they may be compliant with the exchange format as defined in ONNX context and specifications.

In an embodiment, NNR_ONNX units may follow the NNR_SPS units without any model parameter set NNR unit.

In another embodiment, ONNX messages may be carried inside NNR compressed data units (NNR_NDU). A new NNR unit payload type may be defined in order to indicate the carriage of ONNX messages. NNR_ONNX may be defined as a payload type in such a case. No further enumeration of ONNX messages may be performed.

In another embodiment, indication of presence of NNR_ONNX unit types may be signalled in the model parameter set in order to prepare the NNR decoder context for reception of ONNX messages.

Extension 12: Supporting ONNX by carrying them inside NNR units. In this extension, the ONNX messages are stored in the payload of their equivalent NNR Units. The following chart is proposed to make a correspondence between NNR Units and ONNX messages.

| ONNX Message | Corresponding NNR Unit | Identifier in NNR |
|---|---|---|
| Model | NNR_MPS | ONNX_MODEL |
| Model meta data | | ONNX_MODEL_META |
| Operator Set | NNR_TPL | ONNX_OPSET_META |
| Meta data | | ONNX_OPSET_LIST |
| Operator set list | | ONNX_GRAPH |
| Graph | | |
| Nodes | NNR_LPS | ONNX_NODE |
| Tensor elements | NNR_NDU | ONNX_ATT |
| Tensors | NNR_QNT | ONNX_TENSORS |
| | NNR_AGG | |

In an embodiment, ONNX message identifier types may be signalled in the corresponding NNR unit headers so that corresponding NNR unit payloads could be parsed and processed correctly.

In another embodiment, in order to signal that the NNR Unit contains an ONNX message as payload, a new flag or parameter may be introduced in the NNR unit header:

NNR_Payload_Type: when set, the payload contains an ONNX type payload, otherwise normal payload is present. ONNX payload in NNR Units are identified by a 1-byte payload header to identify the ONNX message type, followed by the ONNX message. In another embodiment, NNR_Payload_Type is a parameter instead of a flag and holds one or more payload type identifiers.

| ONNX Payload type Identifier | Example Enumeration value |
|---|---|
| ONNX_MODEL | 0x01 |
| ONNX_METADATA | 0x02 |
| ONNX_NODE | 0x03 |
| ONNX_GRAPH | 0x04 |
| ONNX_OPSET_META | 0x05 |
| ONNX_OPSET_LIST | 0x08 |
| ONNX ATT | 0x09 |
| ONNX_TENSOR | 0x0A |
| Reserved | 0xFF |

In another embodiment, ONNX messages may be carried inside NNR compressed data units (NNR_NDU). A new NNR Unit payload type may be defined in order to indicate the carriage of ONNX messages. NNR_ONNX may be defined as a payload type in such a case. No further enumeration of ONNX messages may be performed.

Supporting NNR in ONNX. In another embodiment, NNR units may be signalled and carried using the ONNX messages. In order to achieve this, each NNR unit may be defined as a structured data and proper proto message may be defined inside each ONNX proto messages to support NNR. The following proto objects corresponding to each NNR unit are introduced and may be defined inside the existing proto messages.

| NNR Unit | Proto object | Proto message |
|---|---|---|
| NNR_MPS | MPS_proto | ModelProto |
| NNR_LPS | LPS_proto | NodeProto |
| NNR_TPS | TPS_proto | GraphProto |
| NNR_NDU | NDU_proto | AttributeProto |
| NNR_QNT | QNT_proto | AttributeProto |
| NNR_AGG | AGG_proto | AttributeProto |

Above-mentioned proto objects could be further specified in the ONNX specification context and then referenced in MPEG NNR context.

In another embodiment, an ONNX to NNR converter could be introduced. The following process may be defined for such an operation:

receiving an ONNX bitstream, ONNX to NNR converter decodes the bitstream with a normal ONNX decoder, then injects the proposed NNR modifications and then encodes an ONNX bitstream that is then decodable with an ONNX decoder and interpreter which understands the injected data structures.

Figure 6:
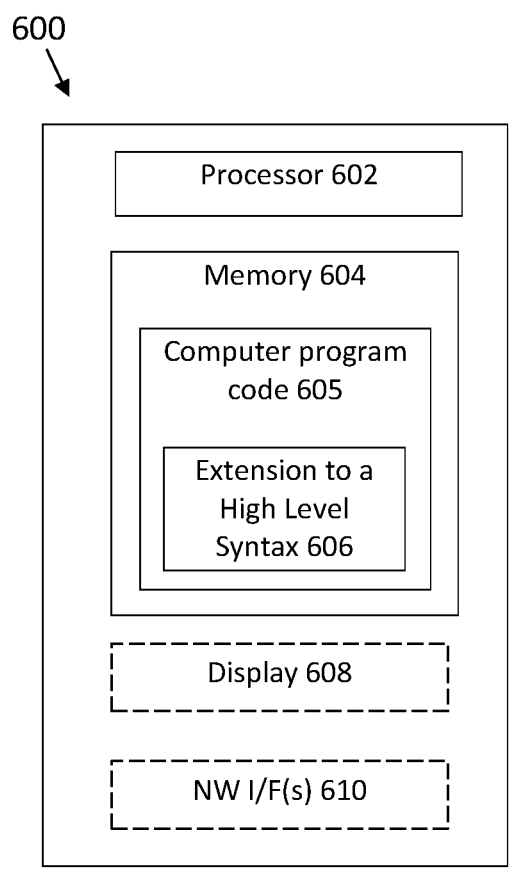
FIG. 6 is an example apparatus configured to implement extensions to a high level syntax for a compressed representation of neural networks.

FIG. 6 is an example apparatus 600, which may be implemented in hardware, configured to implement extensions to high level syntax for a compressed representation of neural networks, based on the examples described herein. The apparatus 600 comprises at least one processor 602, at least one memory 604 including a computer program code 605, wherein the at least one memory 604 and the computer program code 605 are configured to, with the at least one processor 602, cause the apparatus to implement extensions to a high level syntax 606 based on the examples described herein. The apparatus 600 optionally includes a display 608 that may be used to display content during rendering. The apparatus 600 optionally includes one or more network (NW) interfaces (I/F(s)) 610. The NW I/F(s) 610 may be wired and/or wireless and communicate over the Internet/other network(s) via any communication technique. The NW I/F(s) 610 may comprise one or more transmitters and one or more receivers. The N/W I/F(s) 610 may comprise standard well-known components such as an amplifier, filter, frequency-converter, (de)modulator, and encoder/decoder circuitry(ies) and one or more antennas.

The apparatus 600 may be a remote, virtual or cloud apparatus. The apparatus 600 may be either a coder or a decoder, or both a coder and a decoder. The at least one memory 604 may be implemented using any suitable data storage technology, such as semiconductor based memory devices, flash memory, magnetic memory devices and systems, optical memory devices and systems, fixed memory, and removable memory. The at least one memory 604 may comprise a database for storing data. The apparatus 600 need not comprise each of the features mentioned, or may comprise other features as well. The apparatus 600 may correspond to or be another embodiment of the apparatus 50 shown in FIG. 1 and FIG. 2, or any of the apparatuses shown in FIG. 3. The apparatus 600 may correspond to or be another embodiment of the apparatuses shown in FIG. 8, including UE 110, RAN node 170, or network element(s) 190.

Figure 7:
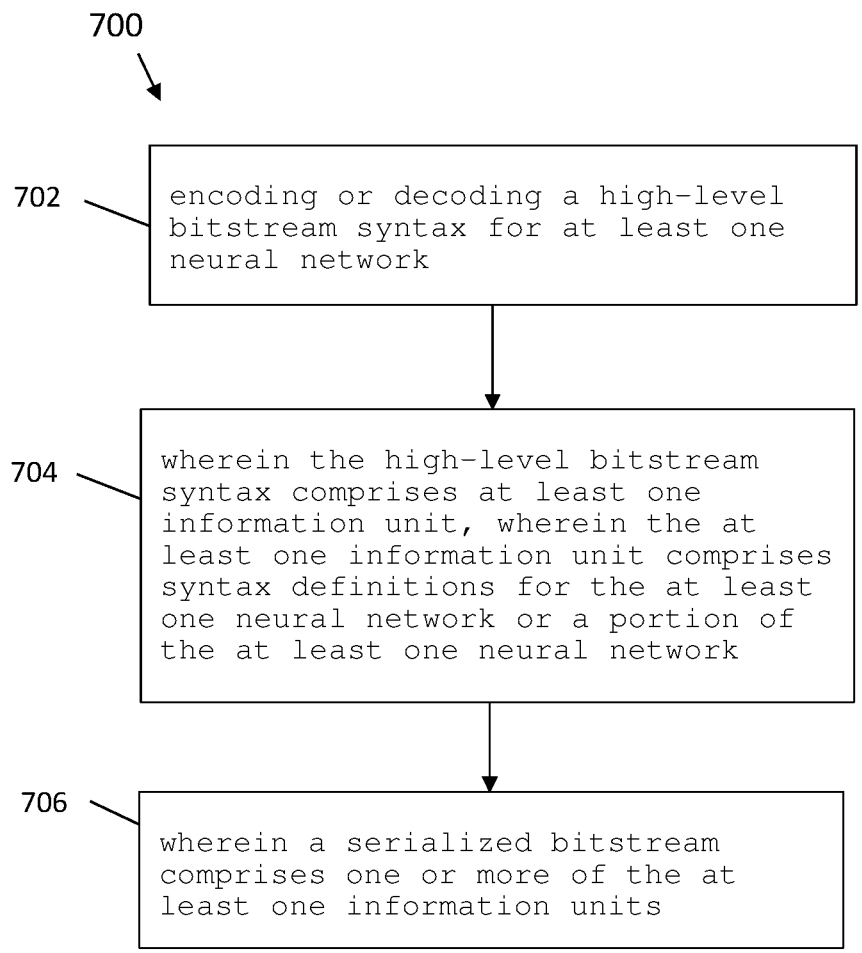
FIG. 7 is an example method to implement extensions to a high level syntax for a compressed representation of neural networks.

FIG. 7 is an example method 700 to implement extension to a high level syntax for a compressed representation of neural networks. At 702, the method includes encoding or decoding a high-level bitstream syntax for at least one neural network. At 704, wherein the high-level bitstream syntax comprises at least one information unit, wherein the at least one information unit comprises syntax definitions for the at least one neural network or a portion of the at least one neural network. At 706, the method includes wherein a serialized bitstream comprises one or more of the at least one information units.

Figure 8:
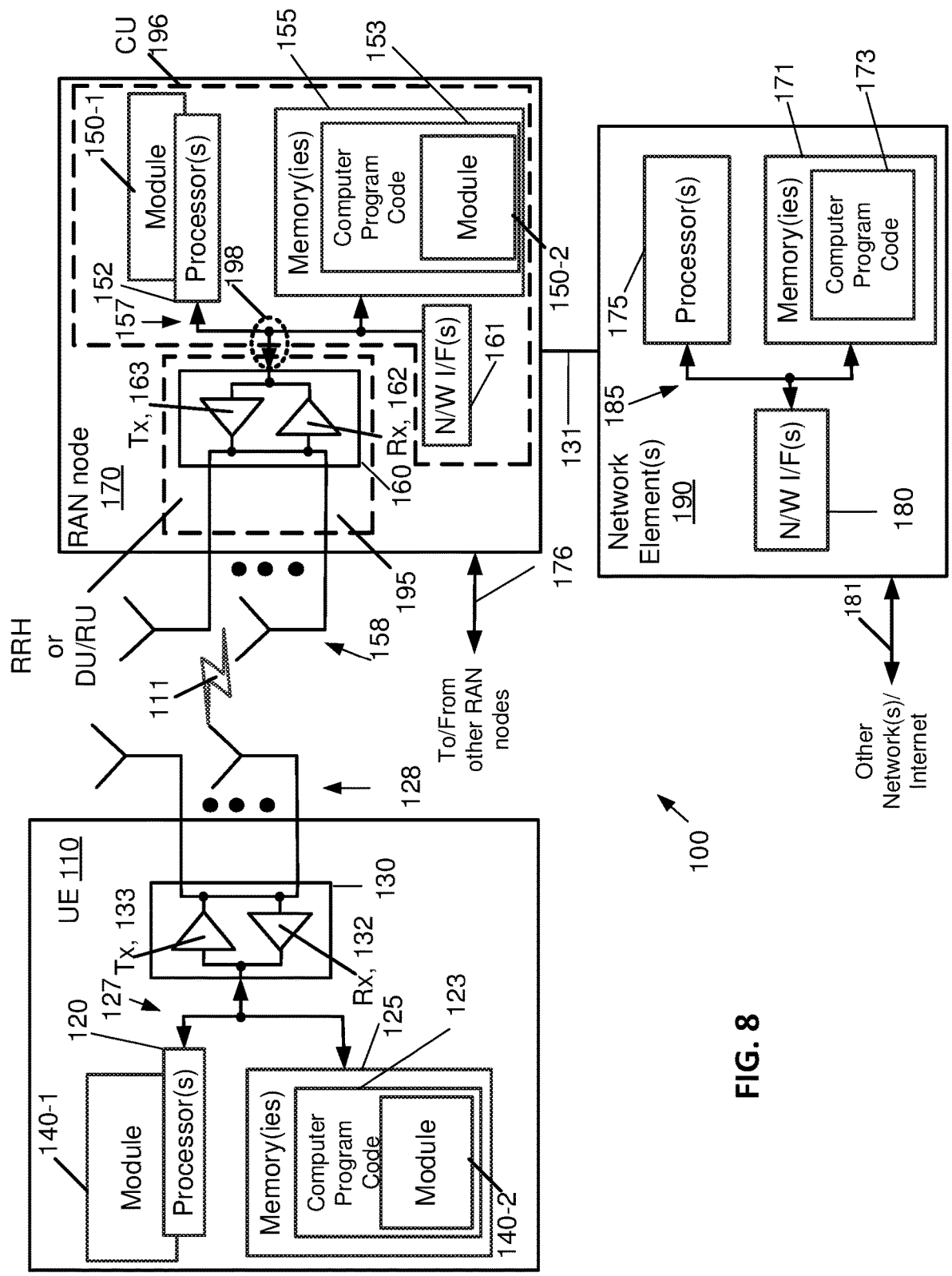
FIG. 8 is a block diagram of one possible and non-limiting system in which the example embodiments may be practiced.

Turning to FIG. 8, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting radio resource control (RRC), SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, for example, as part of a RU, but some examples of this may have the transceiver 160 as part of a separate RU, for example, under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, for example, link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (for example, a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (for example, the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely example functions that may be supported by the network element(s) 190, and note that both 5G and LTE functions might be supported. The RAN node 170 is coupled via a link 131 to the network element 190. The link 131 may be implemented as, for example, an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory, and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

One or more of modules 140-1, 140-2, 150-1, and 150-2 may be configured to implement extensions to a high level syntax for a compressed representation of neural networks based on the examples described herein. Computer program code 173 may also be configured to implement extensions to the high level syntax for a compressed representation of neural networks based on the examples described herein.

References to a 'computer', 'processor', etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device such as instructions for a processor, or configuration settings for a fixed-function device, gate array or programmable logic device, etc.

As used herein, the term 'circuitry' may refer to any of the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This description of 'circuitry' applies to uses of this term in this application. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An example method includes encoding or decoding a high-level bitstream syntax for at least one neural network; wherein the high-level bitstream syntax comprises at least one information unit, wherein the at least one information unit comprises syntax definitions for the at least one neural network or a portion of the at least one neural network; and wherein a serialized bitstream comprises one or more of the at least one information units.

The method may further include, wherein the syntax definitions comprise one or more of following elements: a pipeline of decoding units; a quantization method identification; an update mode information; a performance mapping information; a context reset flag; a context mode; or a context identity.

The method may further include, wherein the pipeline of decoding units comprises information on at least one of: an order of compression steps, type of compression steps, or whether a compression or a decompression step is required or not.

The method may further include, wherein the pipeline of decoding units is carried as part of a topology unit of the serialized bitstream.

The method may further include, wherein the pipeline of decoding units comprises a syntax for decoding pipeline, and wherein the syntax for a decoding pipeline comprises at least one of: information defining number of decoding steps to be performed, information identifying a decoding process or a step to be performed, or a flag indicating whether the decoding process or the step is required for the decoding process.

The method may further include, wherein the quantization method identification is used to signal a quantization method used for: the at least one neural network, a portion of the at least one neural network, or a specific part of the at least one neural network.

The method may further include, wherein the portion or specific part of the at least one neural network comprises at least one of a layer, a filter, a kernel, a bias, quantization weights, a tensor, or a data structure which is an identifiable portion of the at least one neural network.

The method may further include, wherein the update mode information specifies whether an encoded information unit in the serialized bitstream replaces a previously signaled or present data in the at least one neural network; or the encoded information unit is summed to the previously signaled data in the at least one neural network.

The method may further include, wherein the update mode information specifies whether an encoded information unit is combined to the previously signaled data in the at least one neural network.

The method may further include, wherein the encoded information is combined by using a combination operation, and wherein the combination operation comprises at least one of a summation operation, a subtraction operation, a multiplication operation, or a division operation.

The method may further include, wherein the quantization method comprises at least one of a scalar uniform quantization method, a non-scalar uniform quantization method, a codebook quantization method, or a reserved quantization method.

The method may further include, wherein the performance mapping information specifies a mapping between different sparsification thresholds and resulting neural network inference accuracies.

The method may further include, wherein the resulting neural network inference accuracies are provided separately for different aspects or characteristics of output of the at least one neural network.

The method may further include, wherein each sparsification threshold is mapped to separate accuracies for each class, in addition to an overall accuracy which considers all classes.

The method may further include, wherein a class accuracy indicates an accuracy of a class.

The method may further include, wherein each sparsification threshold is mapped to an accuracy measure for a center of a bounding box center and an accuracy measure for a size of the bounding box, when the at least one neural network comprises an object detection neural network.

The method may further include, wherein the performance mapping information comprises a sparsification_performance_map.

The method may further include, wherein the performance mapping information or the sparsification_performance_map includes a count threshold for specifying a number of sparsification thresholds; a sparsification threshold for specifying a threshold which is applied to weights of a decoded the least one neural network or the portion of the at least one neural network in order to set the weights to zero; a non-zero ratio for specifying a non-zero ratio that is achieved by applying the sparsification threshold to sparsify the weights of the decoded the at least one neural network or the portion of the at least one neural network; a neural network accuracy for specifying an overall accuracy of the at least one neural network or the portion of the at least one neural network; a count classes for specifying a number of classes for which separate accuracies are provided for each sparsification threshold; and a neural network class accuracy for specifying accuracy for a certain class, when a certain sparsification threshold is applied.

The method may further include, wherein the context reset flag specifies whether a context for an entropy or an arithmetic coding needs to be reset when decoding a current kernel, a layer, or data contained in an encoded information unit in the serialized bitstream.

The method may further include, wherein the context mode specifies whether the context for an entropy or an arithmetic coding of a current layer or kernel is spatially-neighboring and previously decoded symbols; or symbols at same spatial location in previously decoded layers or kernels.

The method may further include, wherein the context identity specifies which layer or a kernel, which has been previously decoded, is to be used as a context for an entropy or an arithmetic coding of a current layer or a current kernel.

The method may further include, wherein the syntax definitions further comprise a layer parameter set, and wherein the layer parameter set comprises a layer parameter identity list for specifying an array of unique identifiers which map elements in an encoded information unit in the serialized bitstream to corresponding topology elements.

The method may further include, wherein the layer parameter list further comprises tensor dimensions, wherein the tensor dimensions comprises a field for specifying dimensions of a tensor to which the layer parameter set refers.

The method may further include, wherein a compressed or the encoded at least one information unit comprises tensor dimensions, and wherein the tensor dimensions comprise information for specifying dimensions of a tensor carried in a payload of the compressed or encoded at least one information unit.

The method may further include, wherein the tensor dimensions further includes count dimensions comprise a counter for specifying dimensions for a tensor; and a dimension array or list comprising tensor dimension values.

The method may further include, wherein the syntax definitions further comprise a list of shared weights, wherein the list of shared weights comprises a list of all mappings between a unique data element and all shared identifiers.

The method may further include, wherein the syntax definitions further comprise information for indicating that a payload comprises an open neural network exchange (ONNX) message.

The method may further include, wherein the syntax definitions further comprise an element to support the storage and signaling of ONNX-defined messages and formats via the syntax definitions.

The method may further include, wherein the element to support storage and signaling of ONNX defined messages and formats enables storing of ONNX messages in a payload corresponding to an equivalent information unit of the at least one neural network or the portion of the at least one neural network.

The method may further include providing the serialized bitstream to a decoder over a transmission channel.

The method may further include, wherein the at least one neural network comprises a at least one compressed neural network.

The method may further include defining a class index to indicate an index of a class of the at least one neural network or a portion of the at least one neural network.

The method may further include defining a class bitmap to indicate a bit location corresponding to an output class of the at least one neural network or a portion of the at least one neural network.

The method may further include, wherein a most-significant bit of the class bitmap corresponds to a smallest class index.

The method may further include, wherein a most-significant bit of the class bitmap corresponds to a biggest class index.

The method may further include, wherein the class bitmap comprises an array of bytes.

The method may further include defining a count classes to indicate a number of output classes of the at least one neural network or a portion of the at least one neural network.

The method may further include signaling all output classes of the at least one neural network or a portion of the at least one neural network, and wherein a pre-defined value is utilized to indicate a not-applicable or an unknown accuracy value.

An example apparatus includes at least one processor; and at least one non-transitory memory including computer program code; wherein the at least one memory and the computer program code are configured to, with the at least one processor, cause the apparatus at least to perform: encode or decode a high-level bitstream syntax for at least one neural network; wherein the high-level bitstream syntax comprises at least one information unit, wherein the at least one information unit comprises syntax definitions for the at least one neural network or a portion of the at least one neural network; and wherein a serialized bitstream comprises one or more of the at least one information units.

The example apparatus may further include, wherein the apparatus is further caused to perform the methods as described in any of the previous paragraphs.

An example computer readable medium comprising program instructions for causing an apparatus to perform at least the following: encoding or decoding a high-level bitstream syntax for at least one neural network; wherein the high-level bitstream syntax comprises at least one information unit, wherein the at least one information unit comprises syntax definitions for the at least one neural network or a portion of the at least one neural network; and wherein a serialized bitstream comprises one or more of the at least one information units.

The computer readable medium may further include, wherein the program instructions further cause the apparatus to perform the methods as claimed in any of the previous paragraphs.

The computer readable medium may further include, wherein the computer readable medium a non-transitory computer readable medium.

Another example apparatus includes at least one processor; and at least one non-transitory memory including computer program code; wherein the at least one memory and the computer program code are configured to, with the at least one processor, cause the apparatus at least to perform: encode or decode a high-level bitstream syntax for at least one neural network;

wherein the high-level bitstream syntax comprises at least one information unit, wherein the at least one information unit comprises syntax definitions for extensions to the high-level bitstream syntax for the at least one neural network or a portion of the at least one neural network; and wherein a serialized bitstream comprises one or more of the at least one information units.

The apparatus may further include, wherein the apparatus is further caused to perform the methods as claimed in any of the previous paragraphs.

Yet another example apparatus includes at least one processor; and at least one non-transitory memory including computer program code; wherein the at least one memory and the computer program code are configured to, with the at least one processor, cause the apparatus at least to perform: encode or decode a high-level bitstream syntax for at least one neural network; wherein the high-level bitstream syntax comprises at least one information unit, wherein the at least one information unit comprises syntax definitions for the at least one neural network or a portion of the at least one neural network, and wherein the syntax definitions for one or more information units of the at least one information unit comprise information for enabling interoperability between a sender and a receiver of the one or more information units; and wherein a serialized bitstream comprises one or more of the at least one information unit.

The apparatus may further include, wherein the apparatus is further caused to perform the methods as claimed in any of the previous paragraphs.

A still another example apparatus includes at least one processor; and at least one non-transitory memory including computer program code; wherein the at least one memory and the computer program code are configured to, with the at least one processor, cause the apparatus at least to perform: define a data structure comprising: a count threshold field or object to specify a number of sparsification thresholds; a sparsification threshold field or object to specify a threshold which is applied to weights of a decoded the least one neural network or the portion of the at least one neural network in order to set the weights to zero; a non-zero ratio field or object to specify a non-zero ratio that is achieved by applying the sparsification threshold to sparsify the weights of the decoded the at least one neural network or the portion of the at least one neural network; a neural network accuracy field or object to specify an overall accuracy of the at least one neural network or the portion of the at least one neural network; a count classes field or object to specify a number of classes for which separate accuracies are provided for each sparsification threshold; and a neural network class accuracy field or object to specify accuracy for a certain class, when a certain sparsification threshold is applied.

Another example method includes encoding or decoding a high-level bitstream syntax for at least one neural network; wherein the high-level bitstream syntax comprises at least one information unit, and wherein the at least one information unit comprises syntax definitions for the at least one neural network or a portion of the at least one neural network, and wherein the syntax definitions comprise a performance mapping information, wherein the performance mapping information specifies a mapping between different sparsification thresholds and resulting neural network inference accuracies; and wherein a serialized bitstream comprises one or more of the at least one information units.

The method may further include, wherein the resulting neural network inference accuracies are provided separately for different aspects or characteristics of output of the at least one neural network.

The method may further include, wherein each sparsification threshold is mapped to separate accuracies for each class, in addition to an overall accuracy which considers all classes.

The method may further include, wherein each sparsification threshold is mapped to an accuracy measure for a center of a bounding box center and an accuracy measure for a size of the bounding box, when the at least one neural network comprises an object detection neural network.

The method may further include, wherein the at least one neural network or the portion of the at least one neural network comprises a classifier neural network.

The method may further include, wherein the performance mapping information comprises a sparsification_performance_map.

The method may further include, wherein the performance mapping information or the sparsification performance map includes: a count threshold for specifying a number of sparsification thresholds; a sparsification threshold for specifying a threshold which is applied to weights of a decoded the least one neural network or the portion of the at least one neural network in order to set the weights to zero; a non-zero ratio for specifying a non-zero ratio that is achieved by applying the sparsification threshold to sparsify the weights of the decoded the at least one neural network or the portion of the at least one neural network; a neural network accuracy for specifying an overall accuracy of the at least one neural network or the portion of the at least one neural network; a count classes for specifying a number of classes for which separate accuracies are provided for each sparsification threshold; and a neural network class accuracy for specifying accuracy for a certain class, when a certain sparsification threshold is applied.

The method may further include, wherein the syntax definitions further comprise a layer parameter set, and wherein the layer parameter set comprises a layer parameter identity list for specifying an array of unique identifiers which map elements in an encoded information unit in the serialized bitstream to corresponding topology elements.

The method may further include, wherein the layer parameter list further comprises tensor dimensions, wherein the tensor dimensions comprise a field for specifying dimensions of a tensor to which the layer parameter set refers.

The method may further include, wherein the encoded at least one information unit comprises tensor dimensions, wherein the tensor dimensions comprise a field for specifying dimensions of a tensor carried in a payload of the encoded at least one information unit.

The method may further include, wherein the tensor dimensions comprises further: count dimensions comprising a counter for specifying dimensions for a tensor; and a dimension array or list comprising dimension values.

The method may further include, wherein the syntax definitions further comprise information for indicating that a payload comprises an open neural network exchange (ONNX) message.

The method may further include, wherein the syntax definitions further comprise an element to support the storage and signaling of ONNX-defined messages and formats via the syntax definitions.

The method may further include, wherein the element to support-storage and signaling of ONNX defined messages and formats enables storing of ONNX messages in a payload corresponding to an equivalent information unit of the at least one neural network or the portion of the at least one neural network.

The method may further include defining a class index to indicate an index of a class of the at least one neural network or a portion of the at least one neural network.

The method may further include defining a class index to indicate an index of a class of the at least one neural network or a portion of the at least one neural network.

The method may further include defining a class bitmap to indicate a bit location corresponding to an output class of the at least one neural network or a portion of the at least one neural network.

The method may further include, wherein a most-significant bit of the class bitmap corresponds to a smallest class index.

The method may further include, wherein a most-significant bit of the class bitmap corresponds to a biggest class index.

The method may further include, wherein the class bitmap comprises an array of bytes.

The method may further include defining a count classes to indicate a number of output classes of the at least one neural network or a portion of the at least one neural network.

The method may further include signaling all output classes of the at least one neural network or a portion of the at least one neural network, and wherein a pre-defined value is utilized to indicate a not-applicable or an unknown accuracy value.

A still another example apparatus includes at least one processor; and at least one non-transitory memory including computer program code; wherein the at least one memory and the computer program code are configured to, with the at least one processor, cause the apparatus at least to perform: encode or decode a high-level bitstream syntax for at least one neural network; wherein the high-level bitstream syntax comprises at least one information unit, and wherein the at least one information unit comprises syntax definitions for the at least one neural network or a portion of the at least one neural network, and wherein the syntax definitions comprise a performance mapping information, wherein the performance mapping information specifies a mapping between different sparsification thresholds and resulting neural network inference accuracies; and wherein a serialized bitstream comprises one or more of the at least one information units.

The apparatus may further include, wherein the apparatus is further caused to perform the methods as claimed in any of the previous paragraphs.

Another example computer readable medium comprising program instructions for causing an apparatus to perform at least the following: encoding or decoding a high-level bitstream syntax for at least one neural network; wherein the high-level bitstream syntax comprises at least one information unit, and wherein the at least one information unit comprises syntax definitions for the at least one neural network or a portion of the at least one neural network, and wherein the syntax definitions comprise a performance mapping information, wherein the performance mapping information specifies a mapping between different sparsification thresholds and resulting neural network inference accuracies; and wherein a serialized bitstream comprises one or more of the at least one information units.

The computer readable medium may further include, wherein the program instructions further cause the apparatus to perform the methods as described in any of the previous paragraphs.

The computer readable medium may further include, wherein the computer readable medium a non-transitory computer readable medium.

Yet another example method includes defining a data structure including: a count threshold field or object for specifying a number of sparsification thresholds; a sparsification threshold field or object for specifying a threshold which is applied to weights of a decoded the least one neural network or the portion of the at least one neural network in order to set the weights to zero; a non-zero ratio field or object for specifying a non-zero ratio that is achieved by applying the sparsification threshold to sparsify the weights of the decoded the at least one neural network or the portion of the at least one neural network; a neural network accuracy field or object for specifying an overall accuracy of the at least one neural network or the portion of the at least one neural network; a count classes field or object for specifying a number of classes for which separate accuracies are provided for each sparsification threshold; and a neural network class accuracy field or object for specifying accuracy for a certain class, when a certain sparsification threshold is applied.

A yet another example computer readable medium includes program instructions for causing an apparatus to perform at least the includes define a data structure includes: a count threshold field or object to specify a number of sparsification thresholds; a sparsification threshold field or object to specify a threshold which is applied to weights of a decoded the least one neural network or the portion of the at least one neural network in order to set the weights to zero; a non-zero ratio field or object to specify a non-zero ratio that is achieved by applying the sparsification threshold to sparsify the weights of the decoded the at least one neural network or the portion of the at least one neural network; a neural network accuracy field or object to specify an overall accuracy of the at least one neural network or the portion of the at least one neural network; a count classes field or object to specify a number of classes for which separate accuracies are provided for each sparsification threshold; and a neural network class accuracy field or object to specify accuracy for a certain class, when a certain sparsification threshold is applied.

The computer readable medium may further include, wherein the program instructions further cause the apparatus to perform the methods as described in any of the previous paragraphs.

A still another example apparatus includes means for encoding or decoding a high-level bitstream syntax for at least one neural network; and wherein the high-level bitstream syntax comprises at least one information unit, wherein the at least one information unit comprises syntax definitions for the at least one neural network or a portion of the at least one neural network; and wherein a serialized bitstream comprises one or more of the at least one information units.

The apparatus may further include means for causing the apparatus to perform the methods as described in any of the previous paragraphs.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus comprising:
   at least one processor; and
   at least one non-transitory memory including computer program code;
   wherein the at least one memory and the computer program code are configured to, with the at least one processor, cause the apparatus at least to perform:
   define a data structure comprising:
      a count threshold field or object to specify a number of sparsification thresholds;
      a sparsification threshold field or object to specify a sparsification threshold which is applied to weights of a decoded at least one neural network or a portion of the at least one neural network in order to set the weights to zero;
      a non-zero ratio field or object to specify a non-zero ratio that is achieved by applying the sparsification threshold to sparsify the weights of the decoded at least one neural network or the portion of the at least one neural network;
      a neural network accuracy field or object to specify an overall accuracy of the at least one neural network or the portion of the at least one neural network;
      a count classes field or object to specify a number of classes for which separate accuracies are provided for each sparsification threshold; and
      a neural network class accuracy field or object to specify accuracy for a certain class, when a certain sparsification threshold is applied.

2. The apparatus of claim 1, wherein the data structure comprises a sparsification performance map.

3. The apparatus of claim 1, wherein the data structure causes the apparatus to encode or decode a high-level bitstream syntax for at least one neural network; wherein the high-level bitstream syntax comprises at least one information unit, wherein the at least one information unit comprises syntax definitions for the at least one neural network or the portion of the at least one neural network; and wherein a serialized bitstream comprises one or more of the at least one information unit.

4. The apparatus of claim 1, wherein the data structure further comprises an update neural network identifier for specifying a baseline neural network to which a weight-update is applied.

5. The apparatus of claim 1, wherein the data structure further comprises a quantization method identifier for signaling a quantization method used for: the at least one neural network, the portion of the at least one neural network, or a specific part of the at least one neural network.

6. The apparatus of claim 5, wherein the quantization method comprises one of a scalar uniform quantization method, a scalar non-uniform quantization method, a codebook quantization method, or a reserved quantization method.

7. The apparatus of claim 1, wherein the data structure further comprises a count aspect field for specifying a number of aspects of an output of the at least one neural network for which separate accuracies are provided.

8. The apparatus of claim 1, wherein the data structure further comprises neural network aspect accuracy for specifying an accuracy for a certain aspect of an output of the at least one neural network, when the certain sparsification threshold is applied.

9. A method comprising:
   defining a data structure comprising:
      a count threshold field or object for specifying a number of sparsification thresholds;
      a sparsification threshold field or object for specifying a sparsification threshold which is applied to weights of a decoded at least one neural network or a portion of the at least one neural network in order to set the weights to zero;

a non-zero ratio field or object for specifying a non-zero ratio that is achieved by applying the sparsification threshold to sparsify the weights of the decoded at least one neural network or the portion of the at least one neural network;

a neural network accuracy field or object for specifying an overall accuracy of the at least one neural network or the portion of the at least one neural network;

a count classes field or object for specifying a number of classes for which separate accuracies are provided for each sparsification threshold; and a neural network class accuracy field or object for specifying accuracy for a certain class, when a certain sparsification threshold is applied.

10. The method of claim 9, wherein the data structure comprises a sparsification performance map.

11. The method of claim 9, wherein the data structure causes an apparatus to encode or decode a high-level bitstream syntax for at least one neural network; wherein the high-level bitstream syntax comprises at least one information unit, wherein the at least one information unit comprises syntax definitions for the at least one neural network or the portion of the at least one neural network; and wherein a serialized bitstream comprises one or more of the at least one information unit.

12. The method claim 9, wherein the data structure further comprises an update neural network identifier for specifying a baseline neural network to which a weight-update is applied.

13. The method of claim 9, wherein the data structure further comprises a quantization method identifier for signaling a quantization method used for: the at least one neural network, the portion of the at least one neural network, or a specific part of the at least one neural network.

14. The method of claim 13, wherein the quantization method comprises one of a scalar uniform quantization method, a scalar non-uniform quantization method, a codebook quantization method, or a reserved quantization method.

15. The method of claim 9, wherein the data structure further comprises a count aspect field for specifying a number of aspects of an output of the at least one neural network for which separate accuracies are provided.

16. The method of claim 9, wherein the data structure further comprises neural network aspect accuracy for specifying an accuracy for a certain aspect of an output of the at least one neural network, when the certain sparsification threshold is applied.

17. A non-transitory computer readable medium comprising program instructions that, when executed by an apparatus, cause the apparatus to perform at least the following:
define a data structure comprising:
a count threshold field or object for specifying a number of sparsification thresholds;

a sparsification threshold field or object for specifying a sparsification threshold which is applied to weights of a decoded at least one neural network or a portion of the at least one neural network in order to set the weights to zero;

a non-zero ratio field or object for specifying a non-zero ratio that is achieved by applying the sparsification threshold to sparsify the weights of the decoded at least one neural network or the portion of the at least one neural network;

a neural network accuracy field or object for specifying an overall accuracy of the at least one neural network or the portion of the at least one neural network;

a count classes field or object for specifying a number of classes for which separate accuracies are provided for each sparsification threshold; and a neural network class accuracy field or object for specifying accuracy for a certain class, when a certain sparsification threshold is applied.

18. The non-transitory computer readable medium of claim 17, wherein the data structure causes the apparatus to encode or decode a high-level bitstream syntax for at least one neural network; wherein the high-level bitstream syntax comprises at least one information unit, wherein the at least one information unit comprises syntax definitions for the at least one neural network or the portion of the at least one neural network; and wherein a serialized bitstream comprises one or more of the at least one information unit.

19. The non-transitory computer readable medium of claim 17, wherein the data structure further comprises an update neural network identifier for specifying a baseline neural network to which a weight-update is applied.

20. The non-transitory computer readable medium of claim 17, wherein the data structure further comprises a quantization method identifier for signaling a quantization method used for: the at least one neural network, the portion of the at least one neural network, or a specific part of the at least one neural network.

* * * * *